(12) United States Patent
Shishikura

(10) Patent No.: US 7,144,075 B2
(45) Date of Patent: Dec. 5, 2006

(54) SIDE-UNDER SPOILER ATTACHING STRUCTURE

(75) Inventor: Yasuyuki Shishikura, Utsunomiya (JP)

(73) Assignee: Honda Access Corporation, Niza (JP)

( * ) Notice: Subject to any disclaimer, the term of this patent is extended or adjusted under 35 U.S.C. 154(b) by 0 days.

(21) Appl. No.: 10/913,540

(22) Filed: Aug. 9, 2004

(65) Prior Publication Data

US 2005/0218695 A1 Oct. 6, 2005

(30) Foreign Application Priority Data

Mar. 31, 2004 (JP) ............................. 2004-101793
Jul. 13, 2004 (JP) ............................. 2004-206473

(51) Int. Cl.
*B60R 13/00* (2006.01)

(52) U.S. Cl. ..................................... 296/209; 296/1.08

(58) Field of Classification Search ................ 296/209, 296/1.08; 52/716.5, 716.6, 716.7
See application file for complete search history.

(56) References Cited

U.S. PATENT DOCUMENTS

| | | | | |
|---|---|---|---|---|
| 4,011,635 A | * | 3/1977 | Meyer | .......................... 24/293 |
| 5,783,020 A | * | 7/1998 | Kress | .......................... 156/291 |
| 2002/0043041 A1 | * | 4/2002 | Yoyasu | ...................... 52/716.5 |

FOREIGN PATENT DOCUMENTS

JP            8-5872            2/1996

* cited by examiner

*Primary Examiner*—Dennis H. Pedder
(74) *Attorney, Agent, or Firm*—Westerman, Hattori, Daniels & Andrian, LLP.

(57) ABSTRACT

The side-under spoiler attaching structure for attaching the side-under spoilers to the right and left bottom portions of the vehicle body via the brackets employs a structure that; the bracket is formed in a rectangular-plate shape along the front-to-rear direction of the vehicle body; the two-sided tape is provided on the upper portion of the bracket, while a plurality of the supporting members for supporting the side-under spoiler is provided on the bottom portion of the bracket; and the side-under spoiler has a plurality of attaching members for engaging with the plurality of the supporting members of the bracket respectively.

16 Claims, 19 Drawing Sheets

SIDE-UNDER SPOILER ATTACHING STRUCTURE

BACKGROUND OF THE INVENTION

1. Field of the Invention

The present invention relates to a side-under spoiler attaching structure attaching a side-under spoiler(s) to a bottom portion(s) of a vehicle body via a bracket(s).

2. Description of the Related Art

Japanese Utility Model Publication No. 8-5872 discloses a conventional side sill protector attaching structure. This side sill protector attaching structure employs a structure that: bottom portions of brackets are attached onto outer surfaces of side sills of a vehicle; thus providing spaces between upper portions of the brackets and the side sills; upper edges of protectors are inserted into the spaces in order to catch the upper edges of the protectors on the upper portions of the brackets, wherein bend pieces further extending upward and bending toward the outside are provided on the upper portions of the bracket, a plurality of ribs extending vertically are provided on the inner surfaces of the protectors at predetermined intervals along a front-to-rear direction of the vehicle, a latching member is provided on the upper end of each rib, and the latching members are latched together onto the bend pieces of the brackets. According to this side sill protector attaching structure, the bending pieces are provided on the upper portions of the brackets attached onto the outer surfaces of the side sills; the plurality of ribs extending along a vertical direction of the protector are provided on the inner surfaces of the protectors; the latching member is provided on the upper end of each rib; and the latching members are latched together with the bend pieces of the brackets, and thus the latching members of the ribs will be caught on the bend pieces of the brackets when an external force is applied to the protectors. This can prevent the upper edges of the protectors from disengaging from the spaces, and thus the protectors can be prevented from disengaging from the side sills. Moreover, this attaching structure does not cause the "cost-up" as a result, and is less likely to detract from the appearance of the vehicle since this attaching structure employs a simple structure. Further, since its attaching work is only to push the protectors from the above thereof, this attaching structure has an outstanding workability.

According to the above-described side sill protector attaching structure, however, the bottom portions of the brackets are attached onto the outer surfaces of the side sills of the vehicle body by spot welding, and thus there is a room for improvement from a standpoint of workability in the attachment of the side-under spoiler as the side sill protector to the vehicle body via the brackets.

SUMMARY OF THE INVENTION

The present invention has been made to solve the above problem. It is, accordingly, an object of the present invention to provide a side-under spoiler attaching structure which can improve workability in the attachment of a side-under spoiler(s) to a bottom portion(s) of a vehicle body via a bracket(s).

In order to attain the above object, according to a first aspect of the present invention, there is provided a side-under spoiler attaching structure attaching a side-under spoiler(s) to a bottom portion(s) of a body of a vehicle via a bracket(s), wherein: the bracket is one elongated along a front-to-rear direction of the vehicle; a bonding means bonded to the body of the vehicle is provided on an upper portion of the bracket; at least one supporting member for supporting the side-under spoiler is provided on a bottom portion of the bracket; and at least one attaching member is provided on the side-under spoiler, the attaching member engaging with the supporting member by moving the side-under spoiler in the front-to-rear direction of the vehicle.

In the above-described side-under spoiler attaching structure, since the bonding means is provided on the upper portion of the bracket, a peeling load to the bonding means is applied downwardly when the side-under spoiler is attached. Accordingly, the attaching strength when the side-under spoiler is attached can be ensured. Moreover, since the side-under spoiler can be attached onto the bracket by moving it toward the front or rear direction of the vehicle body, a peeling load to the bonding means is applied along the front or rear direction of the vehicle body when the side-under spoiler is attached. Accordingly, the attaching strength when attaching the side-under spoiler can be ensured. Further, since the bracket is fixed on the vehicle body by the bonding means, a process such as welding for fixing the bracket onto the vehicle body is not necessary. Therefore, the side-under spoiler attaching structure can have a good workability in the attachment of the side-under spoiler. Still further, since the process such as welding for fixing the bracket onto the vehicle body is not necessary, a treatment for preventing rusts accompanied by this process is not necessary as a result. Besides, since the bracket is fixed on the vehicle body via the bonding means, a process such as welding of the vehicle body when fixing the bracket is not necessary, thus preventing the detraction from the appearance of the vehicle body when the side-under spoiler is detached.

Alternatively, in the above-described side-under spoiler attaching structure, the supporting member of each of the brackets on right and left bottom portions of the body of the vehicle may respectively engage with the attaching member of each of the side-under spoiler on the right and left bottom portions of the body of the vehicle so as to support the side-under spoilers when the side-under spoilers are moved in the same direction.

Moreover, in the above-described side-under spoiler attaching structure, a plurality of the supporting members may be formed on the bracket along a front-to-rear direction of the bracket at predetermined intervals; a plurality of the attaching members may be formed on the side-under spoiler along a front-to-rear direction of the side-under spoiler at the predetermined intervals; and the plurality of the supporting members may be distant from one another in a vertical direction of the bracket so as to respectively engage with an upper portion of the attaching member or a bottom portion of the attaching member.

Further, in the above-described side-under spoiler attaching structure, at least one of the supporting members may comprise a plurality of supporting pieces, the plurality of supporting pieces being distant from one another in a width direction of the bracket; and the attaching member may be put between the plurality of supporting pieces in the width direction and engage with the plurality of supporting pieces.

Still further, the bracket may comprise a plurality of bracket pieces combined with one another, each of the bracket pieces having at least one supporting member.

BRIEF DESCRIPTION OF THE DRAWINGS

These objects and other objects and advantages of the present invention will become more apparent upon reading of the following detailed description and the accompanying drawings in which:

FIG. 3A is a plan view showing a bracket of FIG. 2, while

FIG. 4A is a perspective view showing the bracket of FIG. 2, while

FIG. 7A is a plan view showing a bracket of FIG. 6, while

FIG. 8A is a perspective view showing the bracket of FIG. 6, while

DETAILED DESCRIPTION OF THE PREFERRED EMBODIMENTS

Preferred embodiments of the present invention will now be described in detail with reference to the accompanying drawings.

Figure 1:
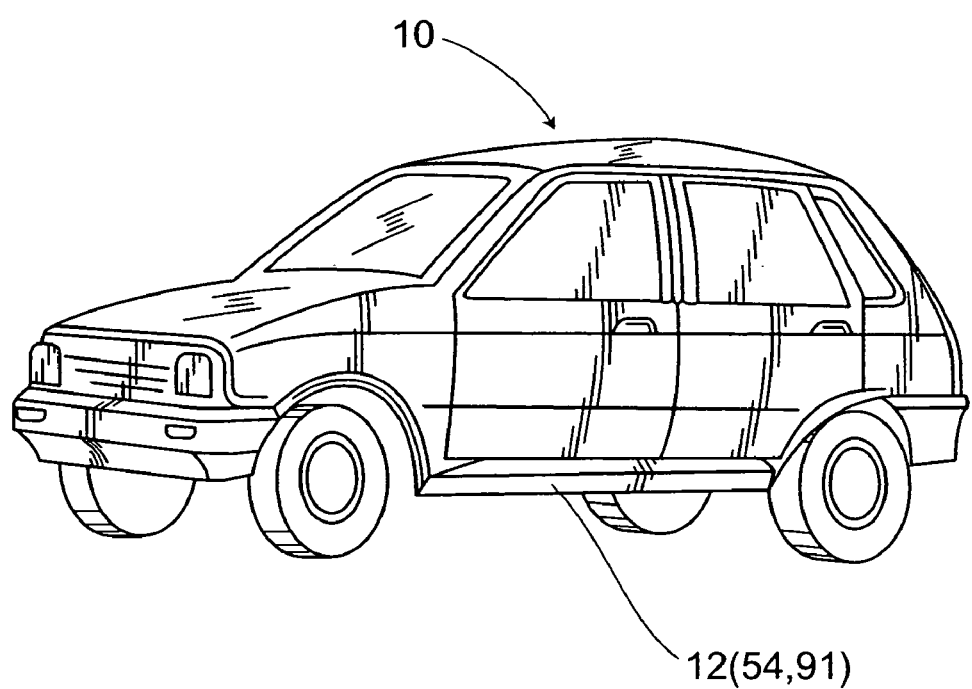
FIG. 1 is a perspective view showing a vehicle in which a side-under spoiler attaching structure according to a first embodiment of the present invention is applied.

FIGS. 1 to 5 show a side-under spoiler attaching structure according to a first embodiment of the present invention. FIG. 1 is a perspective view showing a condition where the side-under spoiler attaching structure A is applied to a vehicle 10 in order to attach a side-under spoiler(s) 12 thereonto. The side-under spoilers 12 are attached onto right and left bottom side portions of the vehicle 10.

Figure 2:
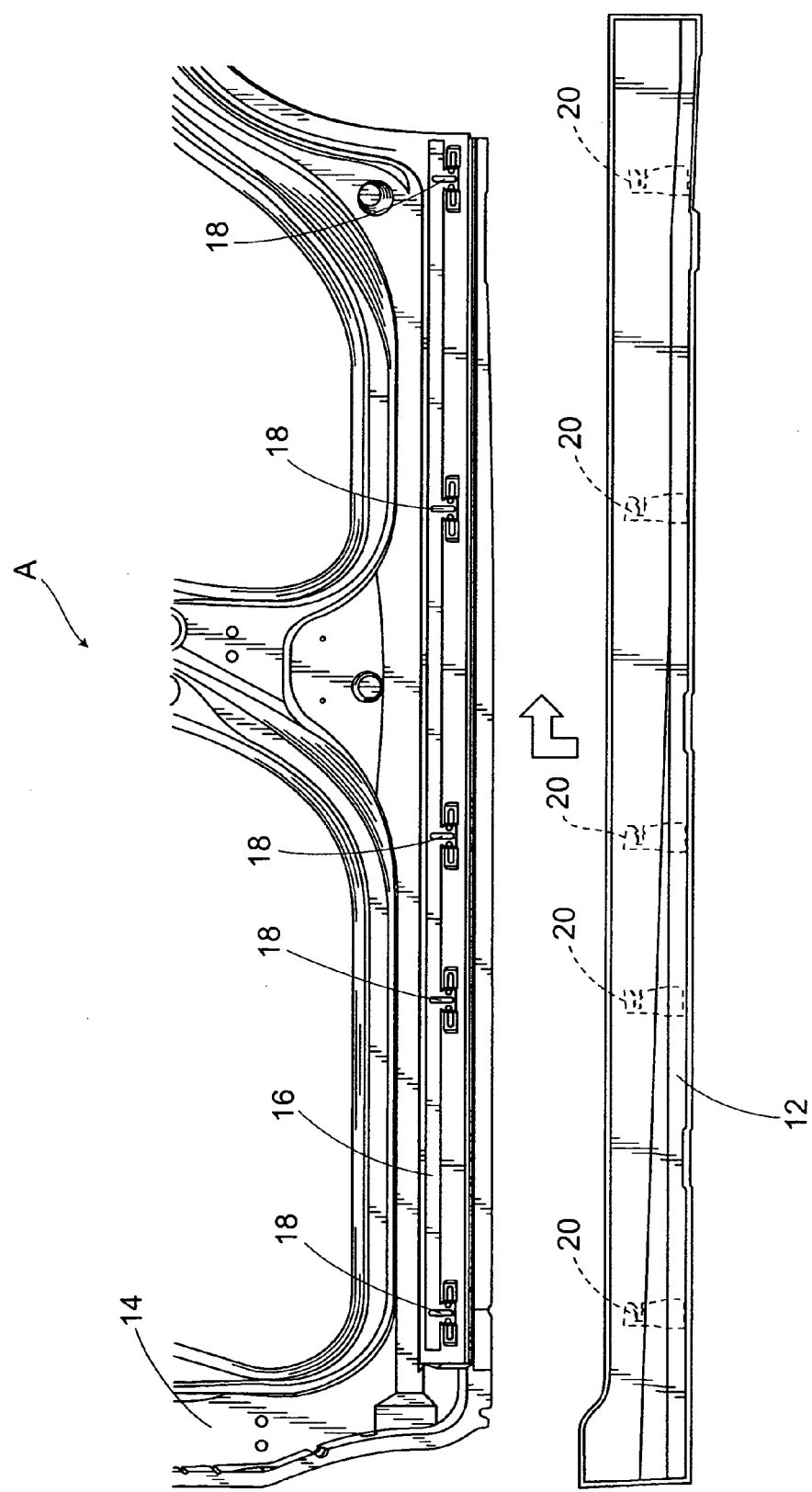
FIG. 2 is a plan view showing the side-under spoiler attaching structure according to the first embodiment.

FIG. 2 also shows the side-under spoiler attaching structure A according to the first embodiment. To each of the bottom side portions of a vehicle body 14, a bracket 16 is fixed by a two-sided tape 15 or the like so that its longitudinal direction is in parallel with a longitudinal direction (front-to-rear direction) of the vehicle body 14. A plurality of supporting members 18 are formed on each of the brackets 16 for supporting the side-under spoiler 12. A plurality of attaching members 20 are formed on respective side-under spoilers 12 for engaging with the plurality of supporting members 18. The plurality of supporting members 18 formed on the bracket 16 engage with the plurality of attaching member 20 respectively, and thus the side-under spoiler 12 is attached onto the vehicle body 14 so that its longitudinal direction is in parallel with the front-to-rear direction of the vehicle body 14.

Figure 3A:
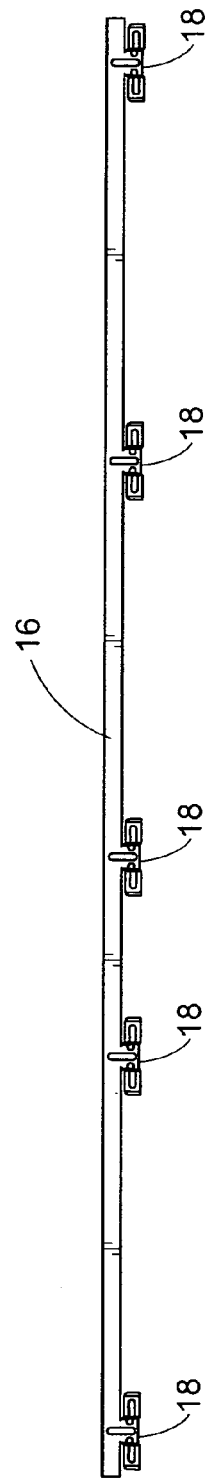

FIG. 3A is a plan view showing the bracket 16. Each of the brackets 16 is formed in an essentially rectangular-plate shape. The plurality of supporting members 18 are formed on the bracket 16 along the longitudinal direction of the bracket 16 at predetermined intervals.

Figure 3B:
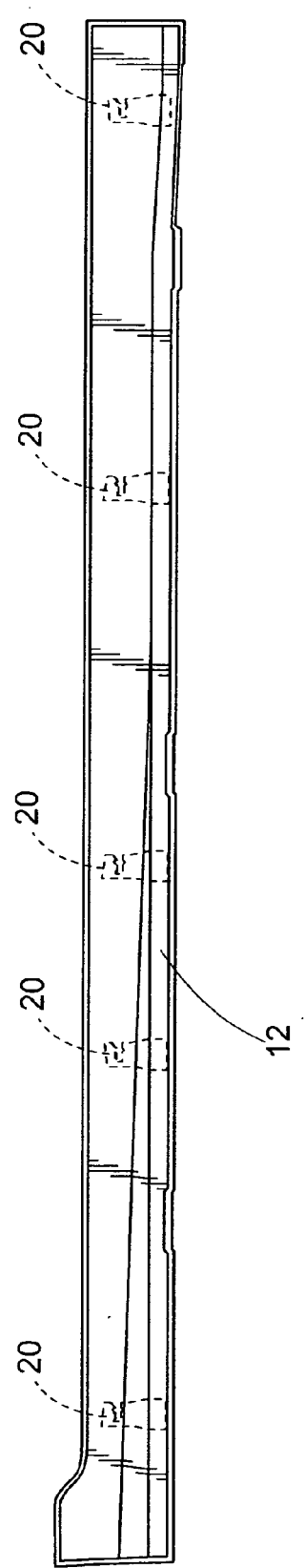
FIG. 3B is a plan view showing a side-under spoiler of FIG. 2.

FIG. 3B is a plan view showing the side-under spoiler 12. Each of the side-under spoilers 12 is formed in an essentially rectangular-box shape so that its rear portion is open-ended. The plurality of attaching members 20 capable of engaging with the plurality of supporting members 18 are formed on the side-under spoiler 12 along the longitudinal direction of the side-under spoiler 12 at predetermined intervals.

Figure 4A:
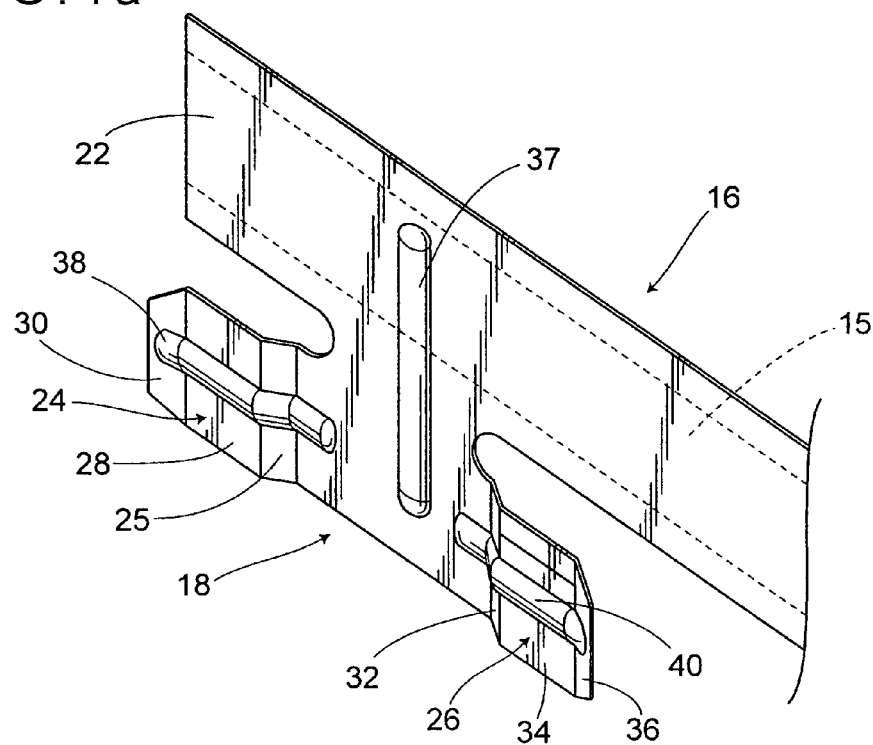

FIG. 4A is a perspective view showing a portion adjacent to one of the supporting members 18 of the bracket 16. The bracket 16 essentially comprises: a bracket body 22; a plurality of first supporting portions 24; and a plurality of second supporting portions 26. The bracket body 22 is formed in an essentially rectangular-plate shape. On the rear surface (inner surface) of the bracket body 22, the two-sided tape 15 is taped. Each of the first supporting portions 24 extends downwardly from a predetermined portion of the bracket body 22, while it also extends toward the left thereof. A base portion 25 which extends toward the left of the first supporting portion 24 inclines toward the front-left direction. A central portion 28 extending toward the left of the first supporting portion 24 is essentially in parallel with the bracket body 22. A front end 30 extending toward the left of the first supporting portion 24 inclines toward the front-left direction from the central portion 28. In a similar way, each of the second supporting portions 26 extends downwardly from a predetermined portion of the bracket body 22, while it also extends toward the right thereof. A base portion 32 extending toward the right of the second supporting portion 26 inclines toward the front-right direction. A central portion 34 extending toward the right of the second supporting portion 26 is essentially parallel to the bracket body 22. A front end 36 extending toward the right of the second supporting portion 26 inclines toward the front-right direction from the central portion 34. Moreover, on a portion in the center of the bracket body 22 and the supporting member 18, a bead (groove) 37 is formed along a vertical direction of the bracket body 22. Further, a bead 38 is formed on a portion in the center of the other portion of the first supporting portion 24 extending to the left. Still further, a bead 40 is formed on a portion in the center of the other portion of the second supporting portion 26 extending to the right.

Figure 4B:
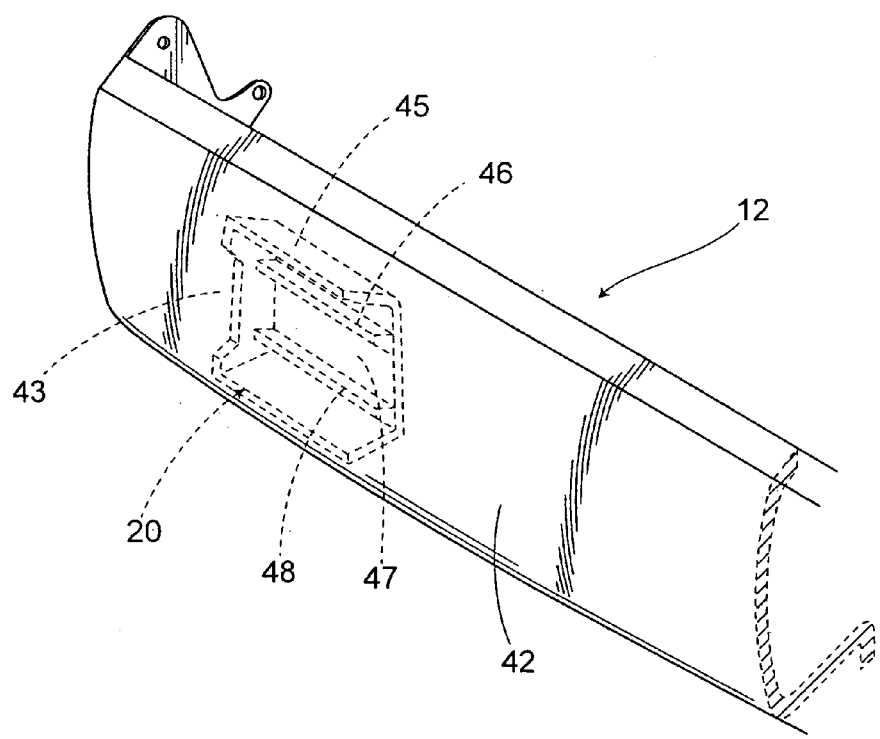
FIG. 4B is a perspective view showing the side-under spoiler of FIG. 2.

FIG. 4B is a perspective view showing a portion adjacent to one of the attaching members 20 of the side-under spoiler 12. Each of the side-under spoilers 12 essentially comprises: a side-under spoiler body 42; and the plurality of attaching members 20 each capable of engaging with the supporting member 18 formed on the bracket 16. The side-under spoiler body 42 is formed in an essentially rectangular-box shape so that its rear portion is open-ended. The plurality of attaching members 20 are formed on the rear surface of the side-under spoiler body 42. Each of the attaching members 20 comprises: an attaching member body 45; an upper rib 46; and a bottom rib 48. The attaching member body 45 is formed on the rear surface of the side-under spoiler body 42 so as to form an inner space. The upper and bottom ribs 46, 48 are formed on the inner surface of the rear portion of the attaching member 20. Openings are formed on the right and left ends of the attaching member 20. The size of the opening 47 formed on the right end of the attaching member 20 is larger than that of the opening 43 formed on the left end thereof in the front-to-rear and left-to-right directions.

Each of the first supporting portions 24 of the bracket 16 and the corresponding attaching member 20 of the side-under spoiler 12 engage with each other by allowing the front end 30 of each first supporting portion 24 to be inserted in between the upper rib 46 and the bottom rib 48 of the corresponding attaching member 20 via the opening 47.

In the similar way, on the opposite side of the side bottom of the vehicle body 14, the plurality of second supporting portions 26 of the bracket 16 engage with the plurality of attaching member 20 respectively.

Figure 5A:
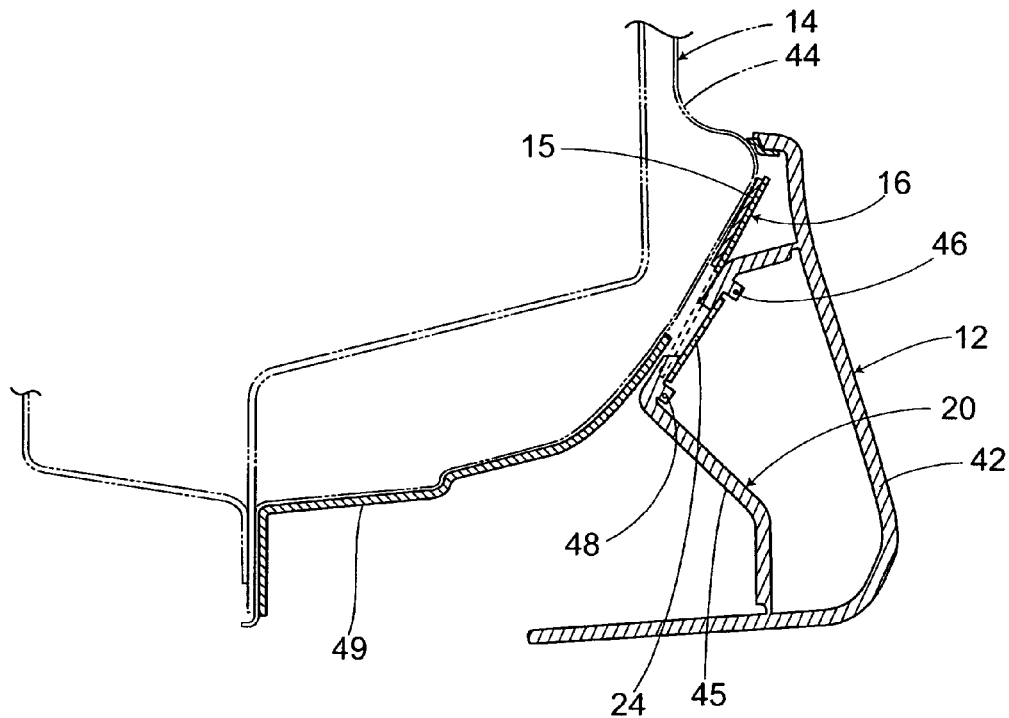
FIGS. 5A and 5B are cross sectional views showing the side-under spoiler attaching structure of the first embodiment.

FIG. 5A is a cross sectional view showing a portion in which one of the supporting members 18 of the bracket 16 engages with the corresponding attaching member 20 of the side-under spoiler 12 in a condition where the bracket 16 is fixed on a body panel 44 and the supporting member 18 engages with the attaching member 20 according to this embodiment. The protruded upper and bottom ribs 46, 48 are formed on the inner surface of the rear portion of the attaching member 20. In the upper end portion of the attaching member 20, its central portion is distant from the side-under spoiler body 42, while its crosswise thickness is small. The bottom end portion of the attaching member 20 is joined to the side-under spoiler body 42 so that its crosswise thickness is smaller than those of the other portions of the attaching member 20. Between the upper and bottom ribs 46, 48, a rear portion of the attaching member 20 is formed so as to vertically set apart from the side-under spoiler body 42. Between the upper rib 46 and the bottom rib 48, the rear surface of the first supporting portion 24 of the bracket 16 contacts the front surface of the rear portion of the attaching member 20 to thereby engage therewith. Meanwhile, a bottom portion of the body panel 44 is coated with an undercoat 49.

Figure 5B:
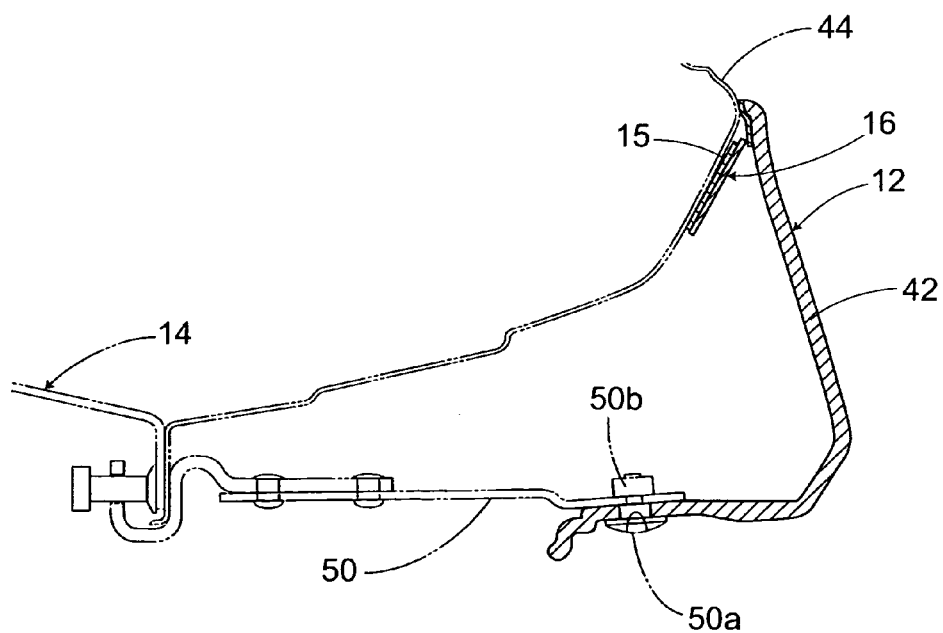

FIG. 5B is a cross sectional view showing a predetermined portion in a condition where the bracket 16 is fixed on the body panel 44 and one of the attaching members 20 of the side-under spoiler 12 engages with the corresponding supporting member 18 of the bracket 16 according to this embodiment. A bottom portion of the side-under spoiler body 42 is fixed by a pair of bolt 50a and nut 50b or the like onto a bracket 50 provided on the vehicle body 14 and extending therefrom.

As described above, according to the first embodiment, the side-under spoiler attaching structure A attaches the side-under spoiler(s) 12 onto the side bottom(s) of the vehicle body 14 via the bracket(s) 16. The side-under spoiler attaching structure A employs a structure that; the bracket 16 is formed in a rectangular-plate shape along the front-to-rear direction of the vehicle body 14; the two-sided tape 15 as a bonding means is provided on the upper portion of the bracket 16, while the plurality of supporting members 18 for supporting the side-under spoiler 12 are provided on the bottom portion of the bracket 16; and the side-under spoiler 12 has the plurality of attaching members 20 engaging with the plurality of the supporting members 18 of the bracket 16 respectively when it is moved toward the front or rear direction of the vehicle body 14. Since the two-sided tape 15 is provided on the upper portion of the bracket 16, a peeling load to the two-sided tape 15 is applied downwardly when the side-under spoiler 12 is attached. Accordingly, the attaching strength when the side-under spoiler 12 is attached can be ensured. Moreover, since the side-under spoiler 12 can be attached onto the bracket 16 by moving it toward the front or rear direction of the vehicle body 14, a peeling load to the two-sided tape 15 is applied along the front or rear direction of the vehicle body 14 when the side-under spoiler 12 is attached. Accordingly, the attaching strength when attaching the side-under spoiler 12 can be ensured. Further, since the bracket 16 is fixed on the vehicle body 14 by the two-sided tape 15 or the like, a process such as welding for fixing the bracket 16 onto the vehicle body 14 is not necessary. Therefore, the side-under spoiler attaching structure A can have a good workability in the attachment of the side-under spoiler 12. Still further, since the process such as welding for fixing the bracket 16 onto the vehicle body 14 is not necessary, a treatment for preventing rusts accompanied by this process is not necessary as a result. Besides, since the bracket 16 is fixed on the vehicle body 14 via the two-sided tape 15 or the like, a process such as welding of the vehicle body 14 when fixing the bracket 16 is not necessary, thus preventing the detraction from the appearance of the vehicle body 14 when the side-under spoiler 12 is detached.

Moreover, according to the first embodiment, the same brackets 16 can be provided on both the right and left bottom portions of the vehicle 14, both of the right and left side-under spoilers 12 can be attached by moving the same direction so as to allow each of the supporting members 18 to engage with the corresponding attaching member 20. That is, the same brackets 16 can be used on the right or the left, and thus the production cost can be lowered compared to a case using different brackets on the right and left bottom portions of the vehicle 14.

Meanwhile, as the bracket 16 is fixed onto a portion of the vehicle body 14 where an undercoat 49 is not applied, the fixing strength can be enhanced compared to a case that the bracket 16 is fixed onto a portion of the vehicle body 14 where the undercoat 49 is applied.

Next, a side-under spoiler attaching structure according to a second embodiment of the present invention will now be explained with reference to FIGS. 6 to 9. Meanwhile, the same reference numbers will denote the same structure portions as the first embodiment, while detailed explanations thereof will be omitted.

Figure 6:
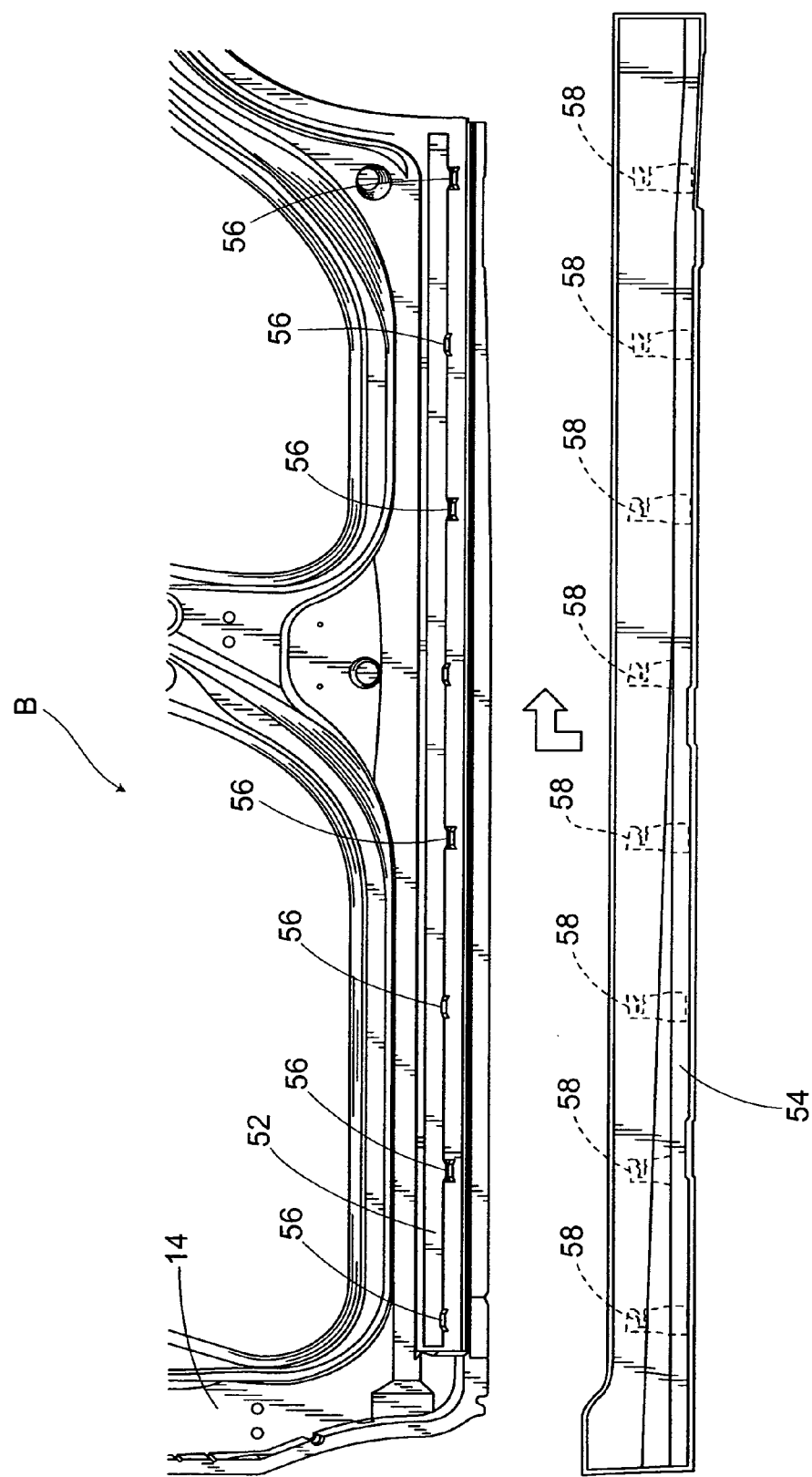
FIG. 6 is a plan view showing a side-under spoiler attaching structure according to a second embodiment of the present invention.

FIG. 6 shows the side-under spoiler attaching structure B according to the second embodiment. On each of the bottom side portions of the vehicle body 14, a bracket 52 is fixed by the two-sided tape 15 or the like so that its longitudinal direction is in parallel with the front-to-rear direction of the vehicle body 14. A plurality of supporting members 56 are formed on the bracket 52 for supporting the side-under spoiler 54. A plurality of attaching members 58 are formed on the side-under spoiler 54 for engaging with the plurality of supporting members 56 respectively. The plurality of supporting members 56 formed on the bracket 52 engage with the plurality of attaching members 58 respectively, and thus the side-under spoiler 54 is attached onto the vehicle body 14 so that its longitudinal direction is in parallel with the front-to-rear direction of the vehicle body 14.

Figure 7A:
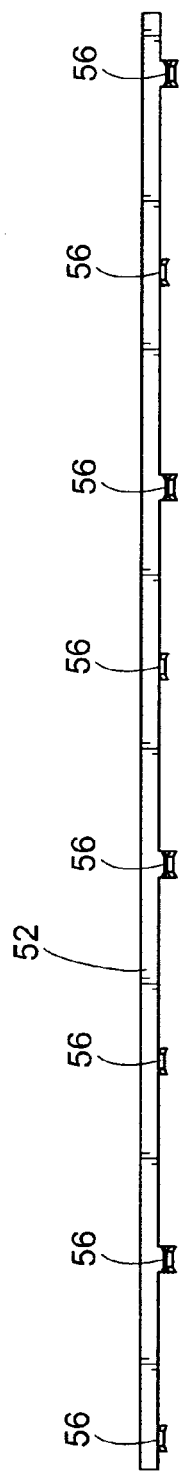

FIG. 7A is a plan view showing the bracket 52. Each of the brackets 52 is formed in an essentially rectangular-plate shape. The plurality of supporting members 56 are formed on the bracket 52 along the longitudinal direction of the bracket 52 at predetermined intervals.

Figure 7B:
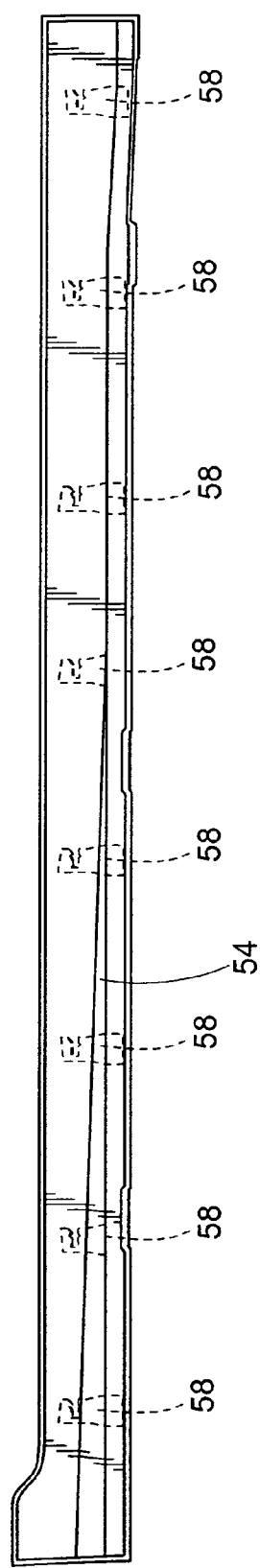
FIG. 7B is a plan view showing a side-under spoiler of FIG. 6.

FIG. 7B is a plan view showing the side-under spoiler 54. Each of the side-under spoilers 54 is formed in an essentially rectangular-box shape so that its rear portion is open-ended. The plurality of attaching members 58 capable of engaging with the plurality of supporting members 56 respectively are formed on the side-under spoiler 54 along the longitudinal direction of the side-under spoiler 54 at predetermined intervals.

Figure 8A:
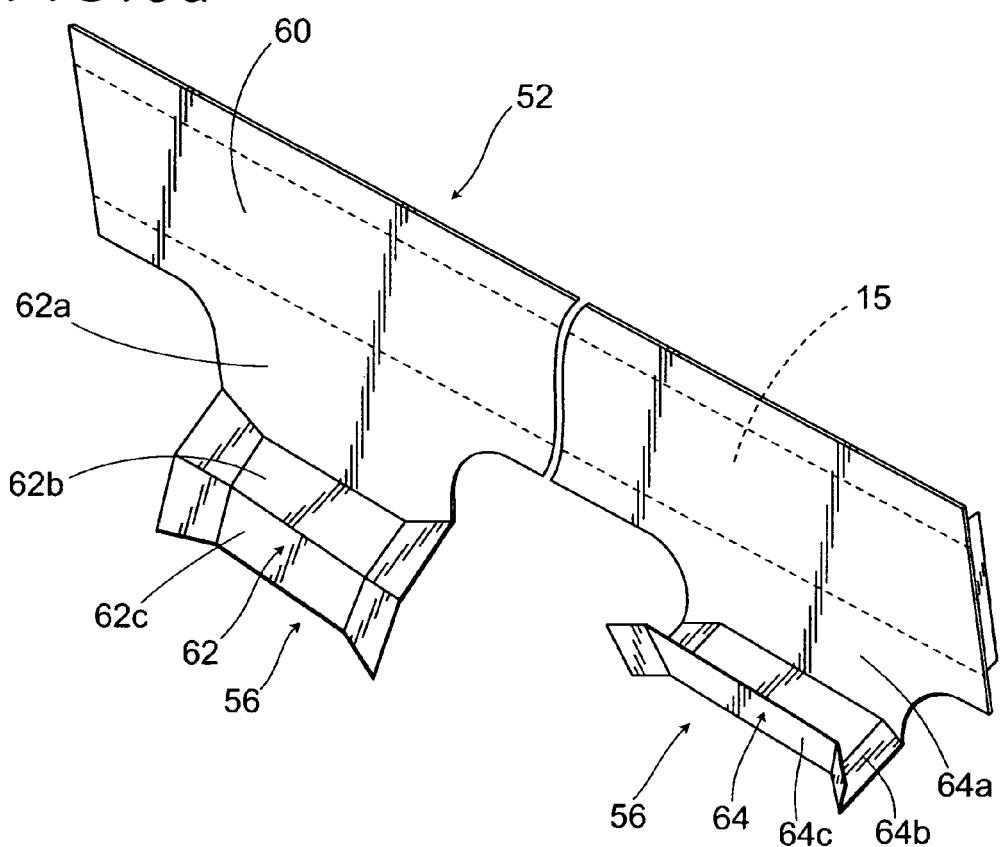

FIG. 8A is a perspective view showing a portion adjacent to one of the supporting members 56 of the bracket 52. The bracket 52 essentially comprises: a bracket body 60; a plurality of third supporting portions 62; and a plurality of fourth supporting portions 64. The bracket body 60 is formed in an essentially rectangular-plate shape. The two-sided tape 15 is taped on the rear surface (inner surface) of the bracket body 60 as the bonding means. Each of the third supporting portions 62 comprises: an extended portion 62a extending downwardly from a predetermined portion of the bracket body 60 along the same plane of the bracket body 60; a bent portion 62b extending from the extended portion 62a and essentially bent perpendicularly toward the front of the bracket 52; and a bent portion 62c extending from an edge of the bent portion 62b, while it is bent downwardly, parallel to the bracket body 60. Both right and left ends of the bent portion 62b incline upwardly. Moreover, both right and left ends of the bent portion 62c incline toward the front. The fourth supporting portion 64 comprises: an extended portion 64a extending downwardly from a predetermined portion of the bracket body 60 parallel to the bracket body 60; a bent portion 64b extending from an edge of the extended portion 64a and essentially bent perpendicularly toward the front; and a bent portion 64c extending from the bent portion 64b and bent downwardly, while it is parallel to the bracket body 60. Both right and left ends of the bent portion 64b incline downwardly. Moreover, both right and left ends of the bent portion 64c incline toward the front.

Figure 8B:
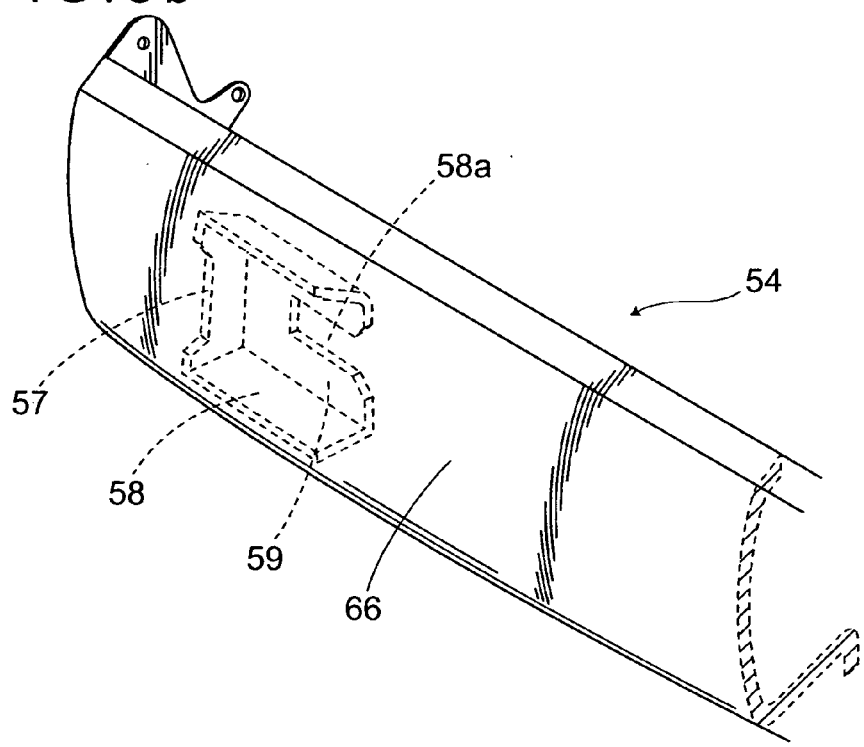
FIG. 8B is a perspective view showing the side-under spoiler of FIG. 6.

FIG. 8B is a perspective view showing a portion adjacent to one of the attaching members 58 of the side-under spoiler 54. Each of the side-under spoilers 54 essentially comprises: a side-under spoiler body 66; and the plurality of attaching members 58 capable of engaging with the plurality of supporting members 56 formed on the bracket 52. The side-under spoiler body 66 is formed in an essentially rectangular-box shape so that its rear portion is open-ended. The plurality of attaching members 58 are formed on the rear surface of the side-under spoiler body 66. Each of the attaching members 58 is provided on the rear surface of the side-under spoiler body 66 so as to form an inner space. Openings are formed on the right and left ends of the attaching member 58. The size of the opening 59 formed on the right end of the attaching member 58 is larger than that of the opening 57 formed on the left end thereof in front-to-rear and left-to-right directions. Meanwhile, a notch 58a is formed on the rear of the attaching member 58.

Each of the bent portions 62c of the third supporting portion 62 is inserted into the corresponding attaching member 58, toward a bottom portion of the inner surface of the corresponding attaching member 58 of the side-under spoiler 54 via the opening 59, while each of the bent portions 64c of the fourth supporting portion 64 is inserted into the corresponding attaching member 58, toward an upper portion of the inner surface of the corresponding attaching member 58 via the opening 59. Accordingly, each of the supporting members 56 of the bracket 52 engages with the corresponding attaching member 58 of the side-under spoiler 54.

In the similar way, on the opposite side of the side bottom of the vehicle body 14, the plurality of third supporting portions 62 of the bracket 52 and the plurality of fourth supporting portions 64 thereof engage with the corresponding attaching member 58 of the side-under spoiler 54.

Figure 9A:
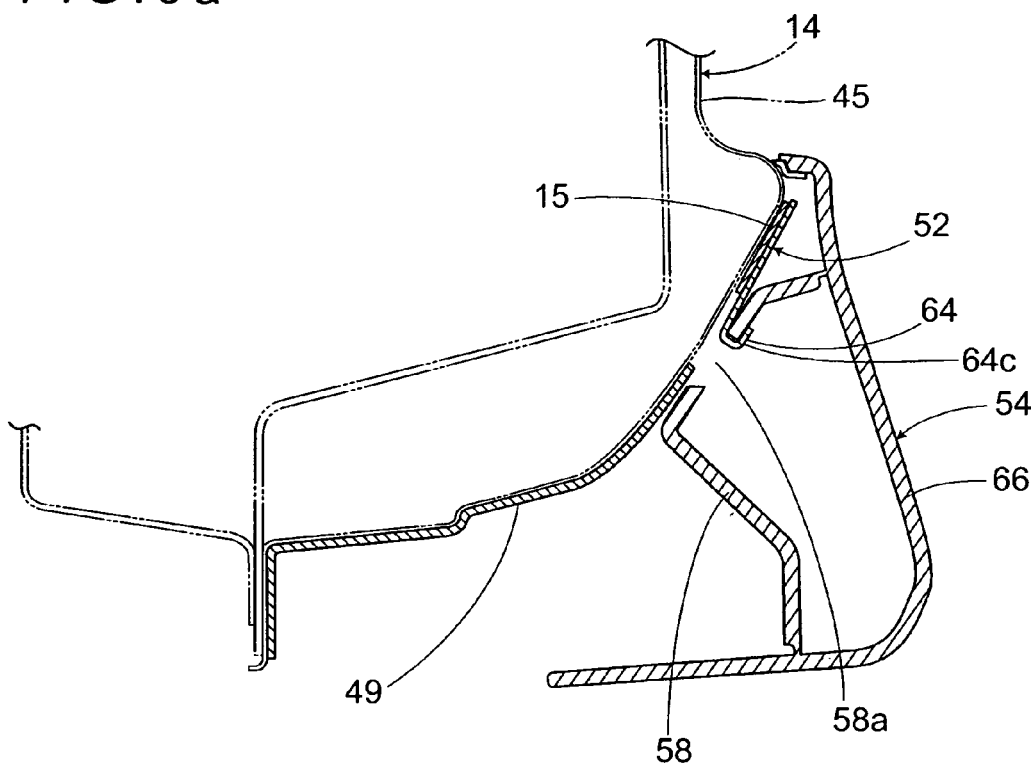
FIGS. 9A and 9B are cross sectional views showing the side-under spoiler attaching structure of the second embodiment.

FIG. 9A is a cross sectional view showing a portion in which one of the fourth supporting portions 64 of the supporting members 56 of the bracket 52 engages with the corresponding attaching member 58 of the side-under spoiler 54 in a condition where the bracket 52 is fixed on the body panel 44 and the fourth supporting portion 64 engages with the attaching member 58 according to this embodiment. In the upper end portion of the attaching member 58, its central portion is distant from the side-under spoiler body 66, while its crosswise thickness is small. The bottom end portion of the attaching member 58 is joined to the side-under spoiler body 66 so that its crosswise thickness is smaller than those of the other portions of the attaching member 58. An opening 58a is formed on the rear portion of the attaching member 58. The fourth supporting portion 64 of the bracket 52 engages with the upper portion of the opening 58a. Meanwhile, a bottom portion of the body panel 44 is coated with an undercoat 49.

Figure 9B:
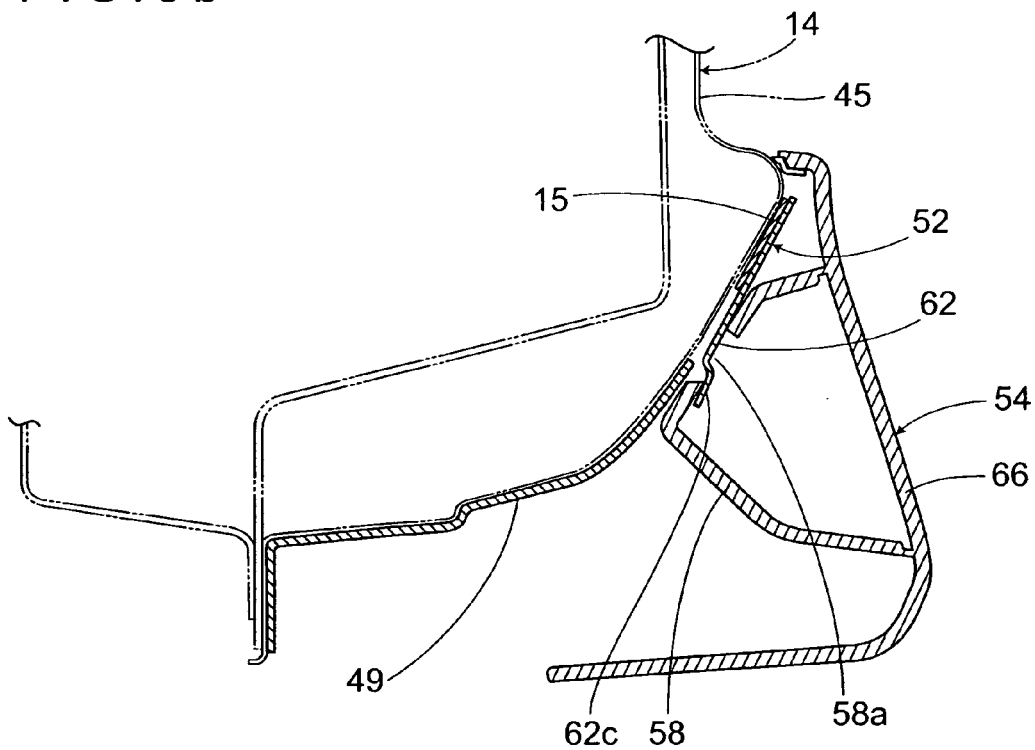

FIG. 9B is a cross sectional view showing a portion in which one of the third supporting portions 62 of the supporting members 56 of the bracket 52 engages with the corresponding attaching member 58 of the side-under spoiler 54 in a condition where the bracket 52 is fixed on the body panel 44 and the third supporting portion 62 engages with the attaching member 58 according to this embodiment. In the upper end portion of the attaching member 58, its central portion is distant from the side-under spoiler body 66, while its crosswise thickness is small. The bottom end portion of the attaching member 58 is joined to the side-under spoiler body 66 so that its crosswise thickness is smaller than those of the other portions of the attaching member 58. An opening 58a is formed on the rear portion of the attaching member 58. The third supporting portion 62 of the bracket 52 engages with the bottom portion of the opening 58a. Meanwhile, a bottom portion of the body panel 44 is coated with the undercoat 49.

Figure 10:
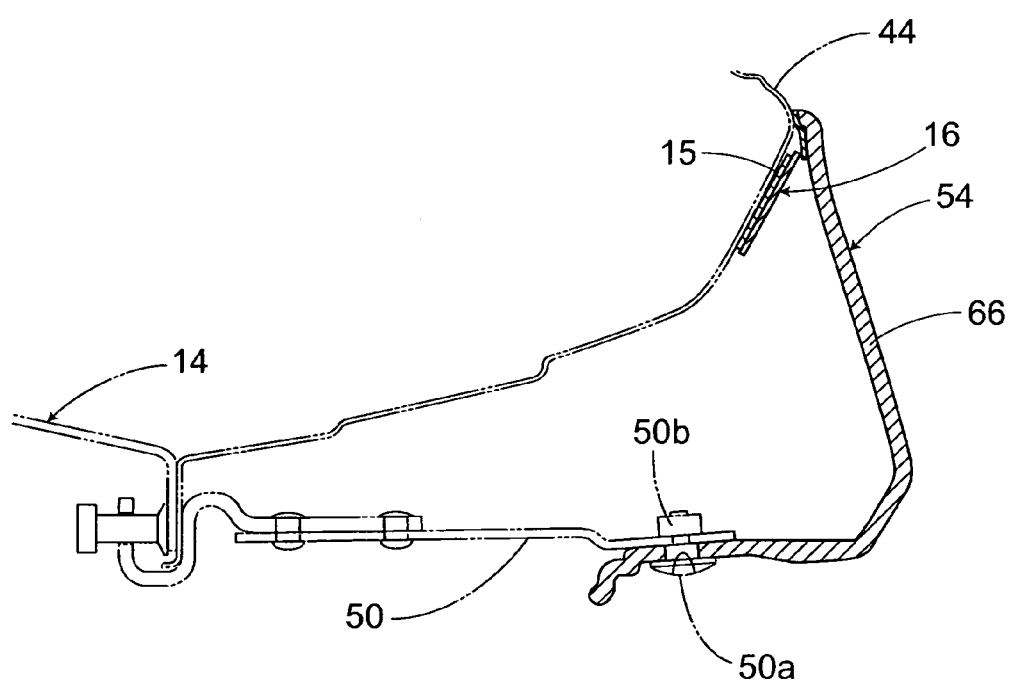
FIG. 10 is a cross sectional view showing the side-under spoiler attaching structure of the second embodiment.

FIG. 10 is a cross sectional view showing a predetermined portion in a condition where the bracket 52 is fixed on the body panel 44 and one of the attaching members 58 of the side-under spoiler 54 engages with the corresponding supporting member 56 of the bracket 52 according to this embodiment. A bottom portion of the side-under spoiler body 66 is fixed onto the bracket 50 provided on the vehicle body 14 and extending therefrom by the pair of bolt 50a and nut 50b or the like.

As described above, according to the second embodiment, the side-under spoiler attaching structure B attaches the side-under spoiler(s) 54 to the side bottom(s) of the vehicle body 14 via the bracket(s) 52. This side-under spoiler attaching structure B employs a structure that; the bracket 52 is formed in a rectangular-plate shape along the front-to-rear direction of the vehicle body 14; the two-sided tape 15 as a bonding means is provided on the upper portion of the bracket 52, while the plurality of supporting members 56 for supporting the side-under spoiler 54 is provided on the bottom portion of the bracket 52; and the side-under spoiler 54 has the plurality of attaching members 58 engaging with the plurality of the supporting members 56 of the bracket 52 respectively when it is moved toward the front or rear direction of the vehicle body 14. Since the two-sided tape 15 is provided on the upper portion of the bracket 52, a peeling load to the two-sided tape 15 is applied downwardly when the side-under spoiler 54 is attached. Accordingly, the attaching strength when the side-under spoiler 54 is attached can be ensured. Moreover, since the side-under spoiler 54 can be attached onto the bracket 52 by moving it toward the front or rear direction of the vehicle body 14, a peeling load to the two-sided tape 15 is applied along the front or rear direction of the vehicle body 14 when the side-under spoiler 54 is attached. Accordingly, the attaching strength when attaching the side-under spoiler 54 can be ensured. Further, since the bracket 52 is fixed on the vehicle body 14 by the two-sided tape 15 or the like, a process such as welding for fixing the bracket 52 onto the vehicle body 14 is not necessary. Therefore, the side-under spoiler attaching structure B can have a good workability in attaching the side-under spoiler 54. Still further, since the process such as welding for fixing the bracket 52 onto the vehicle body 14 is not necessary, a treatment for preventing rusts accompanied by this process is not necessary as a result. Besides, since the bracket 52 is fixed on the vehicle body 14 via the two-sided tape 15 or the like, a process such as welding of the vehicle body 14 when fixing the bracket 52 is not necessary, thus preventing the detraction from the appearance of the vehicle body 14 when the side-under spoiler 54 is detached.

Moreover, according to the second embodiment, the same brackets 52 can be provided on both of the right and left bottom portions of the vehicle 14, both of the right and left side-under spoilers 54 can be attached by moving in the same direction so as to allow each of the supporting members 56 to engage with the corresponding attaching member 58. That is, the same brackets 52 can be used on the right or the left, and thus the production cost can be lowered compared to a case using different brackets on the right and left bottom portions of the vehicle body 14.

Further, since the supporting members 56 are formed on the bracket 52 at predetermined intervals along the front-to-rear direction of the vehicle body 14 upwardly or downwardly so as to engage with the upper or bottom sides of the corresponding attaching member 58 of the side under spoiler 54, a clearance between the bracket 52 and the side-under spoiler 54 along the vertical direction thereof can be narrowed when the side-under spoiler 54 is attached onto the bracket 52. This makes it possible to prevent the bracket 52 and the side-under spoiler 54 from freely moving.

Meanwhile, when the bracket 52 is fixed on a portion of the vehicle body 14 where the undercoat 49 is not applied, the fixing strength can be enhanced compared to a case fixing the bracket 52 on a portion of the vehicle body 14 where the undercoat 49 is applied.

Next, a side-under spoiler attaching structure according to a third embodiment of the present invention will now be explained with reference to FIGS. 11 to 19. Meanwhile, the same reference numbers will denote the same structure portions as the first and second embodiments, while detailed explanations thereof will be omitted.

Figure 11:
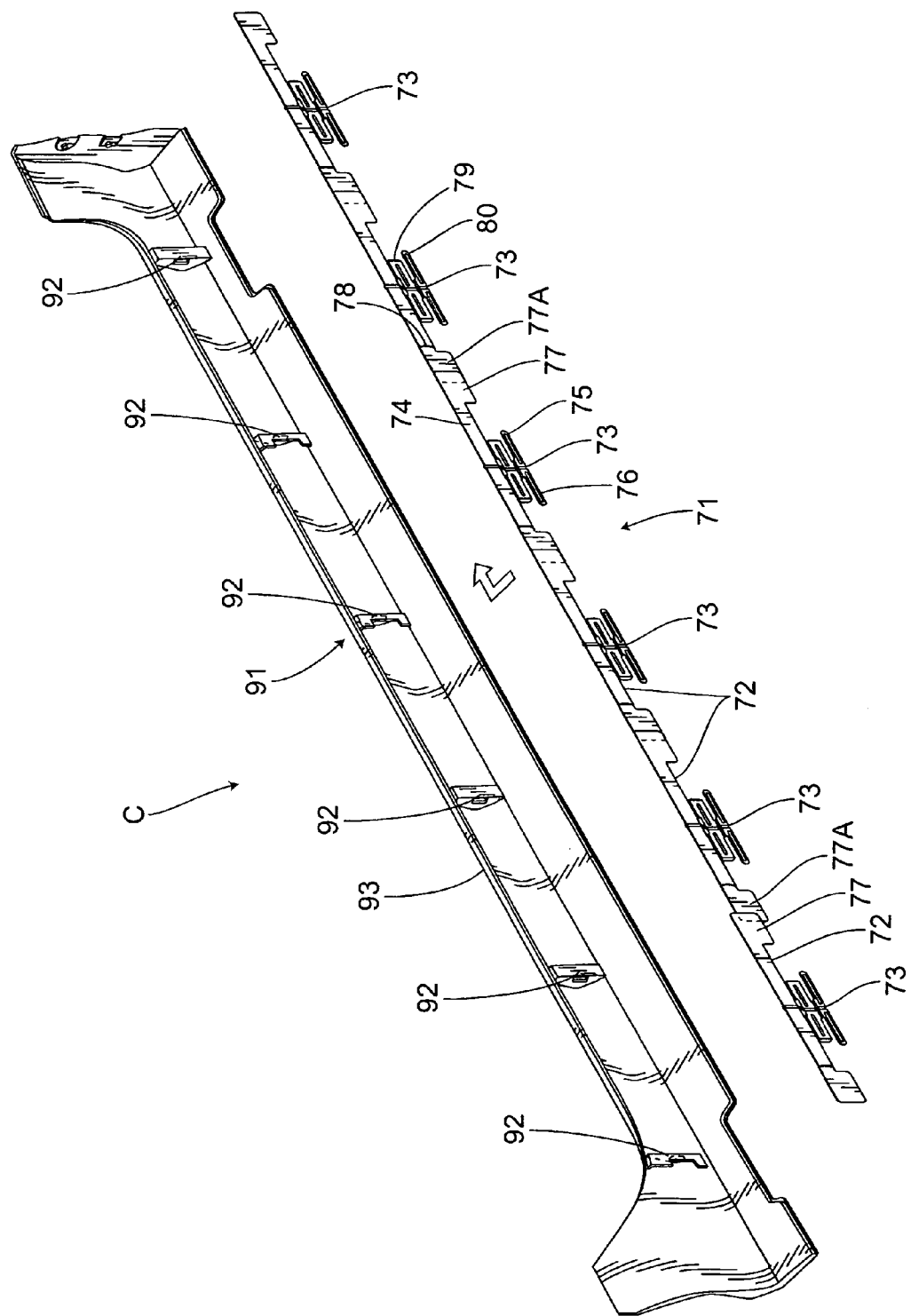
FIG. 11 is an exploded perspective view showing a side-under spoiler attaching structure according to a third embodiment of the present invention.
Figure 12:
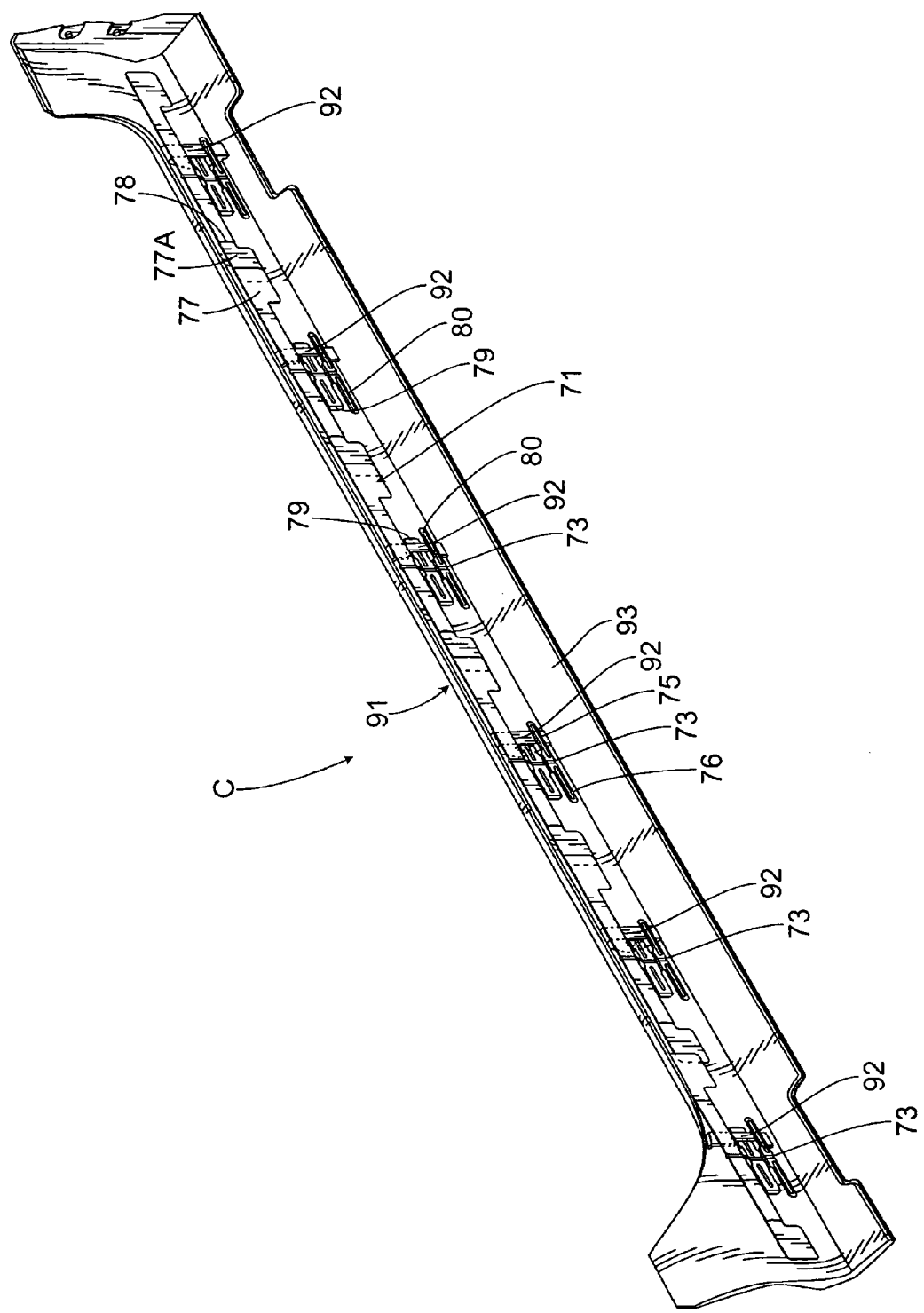
FIG. 12 is a perspective view showing the side-under spoiler attaching structure according to the third embodiment.

FIGS. 11 and 12 show the side-under spoiler attaching structure C according to the third embodiment. On each of the bottom side portions of the vehicle body 14, a bracket 71 is fixed by the two-sided tape (pressure-sensitive adhesive double coated tape) 15 or the like so that its longitudinal direction is in parallel with the front-to-rear direction of the vehicle body 14. The bracket 71 comprises a plurality of bracket pieces 72, while the plurality of bracket pieces 72 are arranged so that longitudinal directions thereof are in parallel with the front-to-rear direction of the vehicle body 14. At least one supporting member 73 supporting the side-under spoiler 91 is formed on each of the bracket pieces 72. In this embodiment, one bracket piece 72 has one supporting member 73.

A plurality of attaching members 92 are formed on the side-under spoiler 91 for engaging with the plurality of supporting members 73 of the bracket 71. The plurality of supporting members 73 formed on the bracket 71 engage with the plurality of attaching members 92 respectively, and thus the side-under spoiler 91 is attached onto the vehicle body 14 so that its longitudinal direction is in parallel with the front-to-rear direction of the vehicle body 14.

Figure 13:
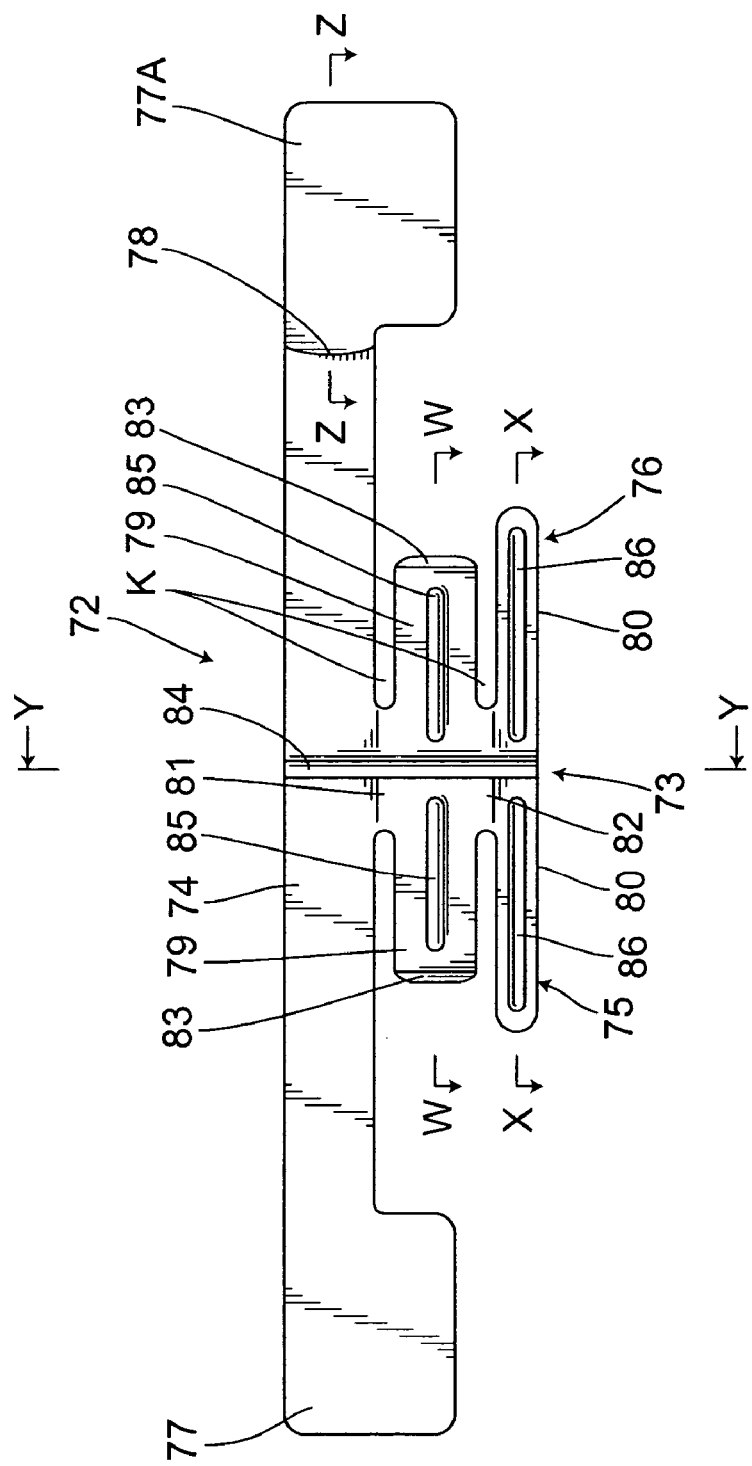
FIG. 13 is a front view showing a bracket piece.
Figure 14A:
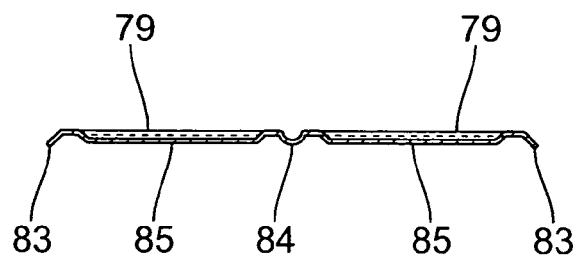
FIG. 14A is a cross sectional view of the bracket piece of FIG. 13 taken along a line W—W.
Figure 14B:
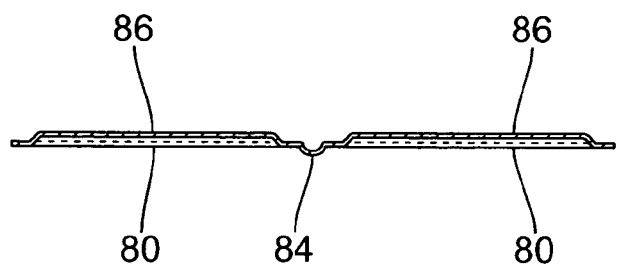
FIG. 14B is a cross sectional view of the bracket piece of FIG. 13 taken along a line X—X.
Figure 14C:
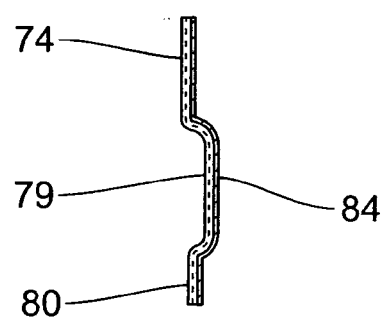
FIG. 14C is a cross sectional view of the bracket piece of FIG. 13 taken along a line Y—Y.
Figure 14D:
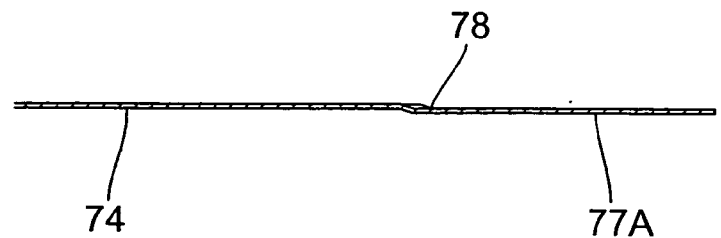
FIG. 14D is a cross sectional view of the bracket piece along a line Z—Z.

FIG. 13 is a front view showing one of the bracket pieces 72 included in the bracket 71. This bracket piece 72 essentially comprises: a piece body 74; a fifth supporting portion 75; and a sixth supporting portion 76. The fifth and sixth supporting portions 75, 76 make up the supporting member 73. The piece body 74 is formed in an essentially rectangular-plate shape, while both ends thereof in longitudinal direction form superposition members 77, 77A. The superposition members 77, 77A are wider than a central portion of the piece body 74. An offset 78 is formed on a proximal portion of the superposition member 77A so that a rear surface of the superposition member 77A aligns a front surface of the central portion of the piece body 74. The two-sided tape 15 as the bonding means is provided on the rear surface of the piece body 74. The superposition member 77A of one bracket piece 72 is joined to the superposition member 77 of the other bracket piece 72, while those superposition members 77, 77A are aligned with each other in the vertical and right-to-left directions thereof when joined. Accordingly, degree of freedom in making up the bracket 71 can be improved. Moreover, by adjusting an overlap space of the superposition members 77, 77A along the longitudinal direction, the positions of the bracket pieces 72 along the right-to-left direction (the longitudinal direction) can be adjusted. Further, by adjusting an overlap space of the superposition members 77, 77A along the vertical direction, the positions of the bracket pieces 72 along the vertical direction can be adjusted since the superposition members 77, 77A are wider than the central portion of the piece body 74 along the vertical direction. The superposition members 77, 77A can be integrally joined with each other by spot welding, bonding or the like, while a surface of the superposition member 77 contacts a surface of the superposition member 77A, and thus the superposition members 77, 77A can be strongly joined.

As shown in FIGS. 13 and 14, both of the fifth supporting portion 75 on the left of the bracket piece 72 in FIG. 13 and the sixth supporting portion 76 on the right thereof in FIG. 13 are formed in symmetrical. Each of the fifth and sixth supporting portions 75, 76 has: an outer supporting piece 79 extending parallel to the piece body 74 at an interval K in the vertical direction; and an inner support piece 80 extending parallel to the outer supporting piece 79 at the intervals K in the vertical direction. A size of the outer supporting piece 79 in the vertical direction is the same as that of the central portion of the piece body 74, while a size of the inner supporting piece 80 in the vertical direction is smaller than that of the outer supporting piece 79.

Figure 15:
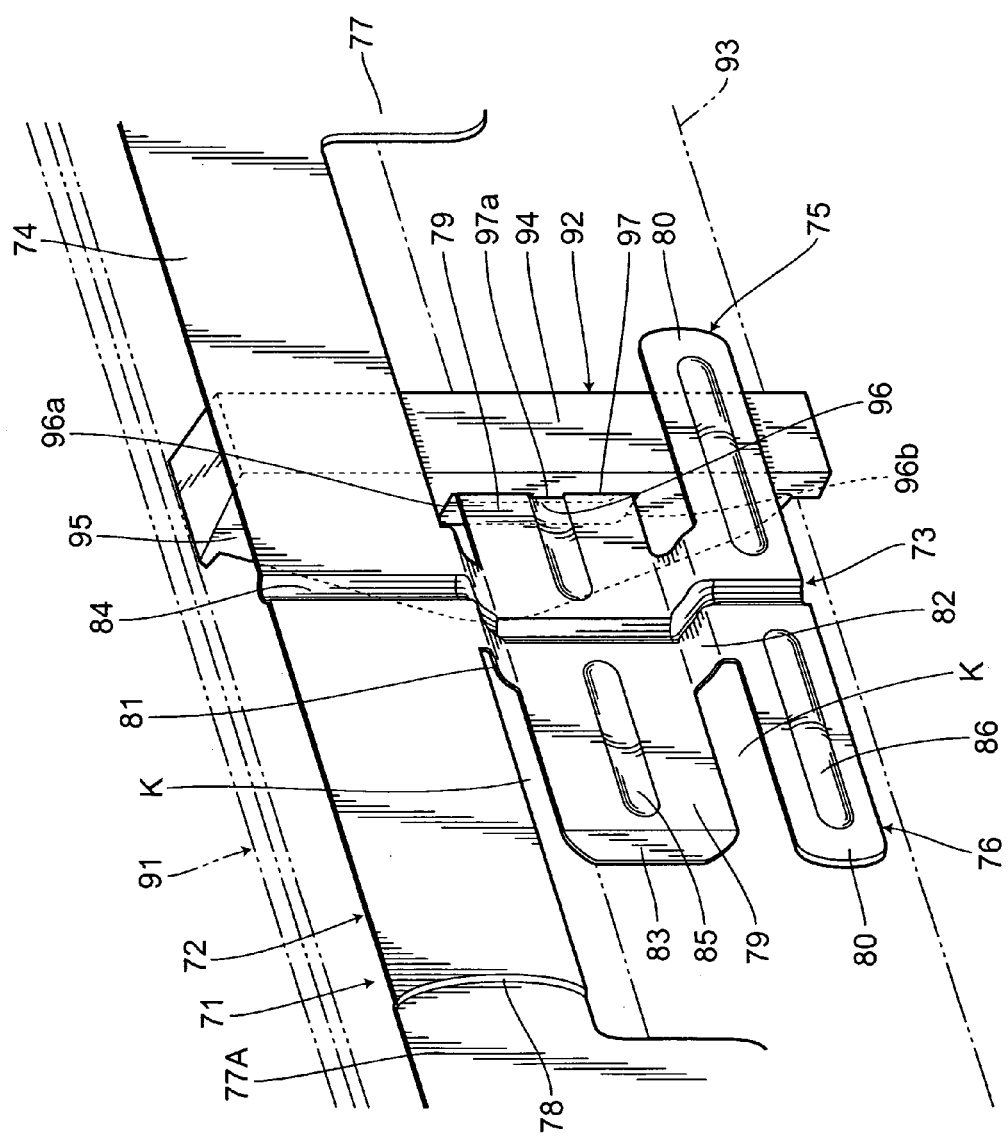
FIG. 15 is a perspective view showing a supporting member and an attaching member in attached condition.

Moreover, as shown in FIG. 15, etc, a notch 81 in the width direction is formed on a portion where the piece body 74 and the outer supporting pieces 79 are joined. A notch 82 also in the width direction is formed on a portion where the outer supporting pieces 79 and the inner supporting pieces 80 are joined. The piece body 74 and the outer supporting pieces 79 are distant from one another in the width direction by the notch 81, while the outer supporting pieces 79 and the inner supporting pieces 80 are distant from one another in the width direction by the notch 82. The piece body 74 and the inner supporting pieces 80 are essentially in the same plane. Meanwhile, the word, "width direction" in this specification means a direction between the front surface of the bracket 71 and the rear surface thereof.

A front end 83 of the outer supporting piece 79 of the fifth supporting portion 75 inclines toward the front-left direction thereof, while a front end 83 of the outer supporting piece 79 of the sixth supporting portion 76 inclines toward the front-right direction thereof. An edge of the front end 83 is chamfered and curved, while a front end of the inner supporting piece 80 is also chamfered and curved.

On a portion in the center of the bracket piece 72, a bead 84 is formed along the vertical direction. The bead 84 is convex frontward. Moreover, a bead 85 is formed on a portion in the center of the outer supporting piece 79 along the right-to-left direction. The bead 85 is convex frontward. Further, a bead 86 is formed on a portion in the center of the inner supporting piece 80 along the right-to-left direction. The bead 85 is convex rearwardly. Meanwhile, the beads 84, 85, and 86 are formed by pressing the plate material of the bracket piece 72 or the like, while cross-sectional properties of the portions where the beads 84, 85 and 86 are enhanced.

As shown in FIGS. 11, 15 through 19, each of the side-under spoilers 91 essentially comprises: a side-under spoiler body 93; and the plurality of attaching members 92 capable of engaging with the plurality of supporting members 73 formed on the bracket 71. The side-under spoiler body 93 is formed in an essentially rectangular-box shape so that its rear portion is open-ended. FIG. 11 is a rear view of the side-under spoiler body 93. The plurality of attaching members 92 are integrally formed on the rear surface of the side-under spoiler body 93.

Figure 16:
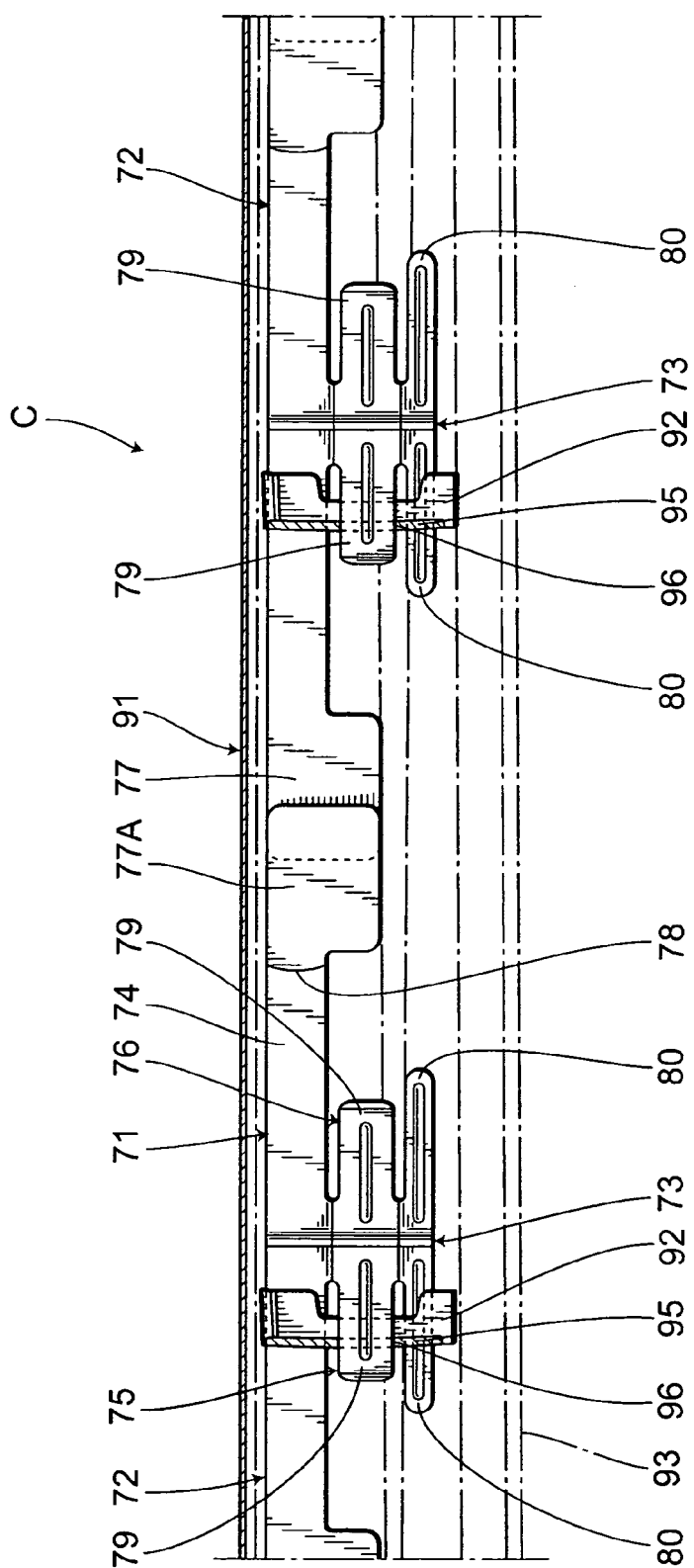
FIG. 16 is a front view showing the supporting members and the attaching members in attached condition.
Figure 19:
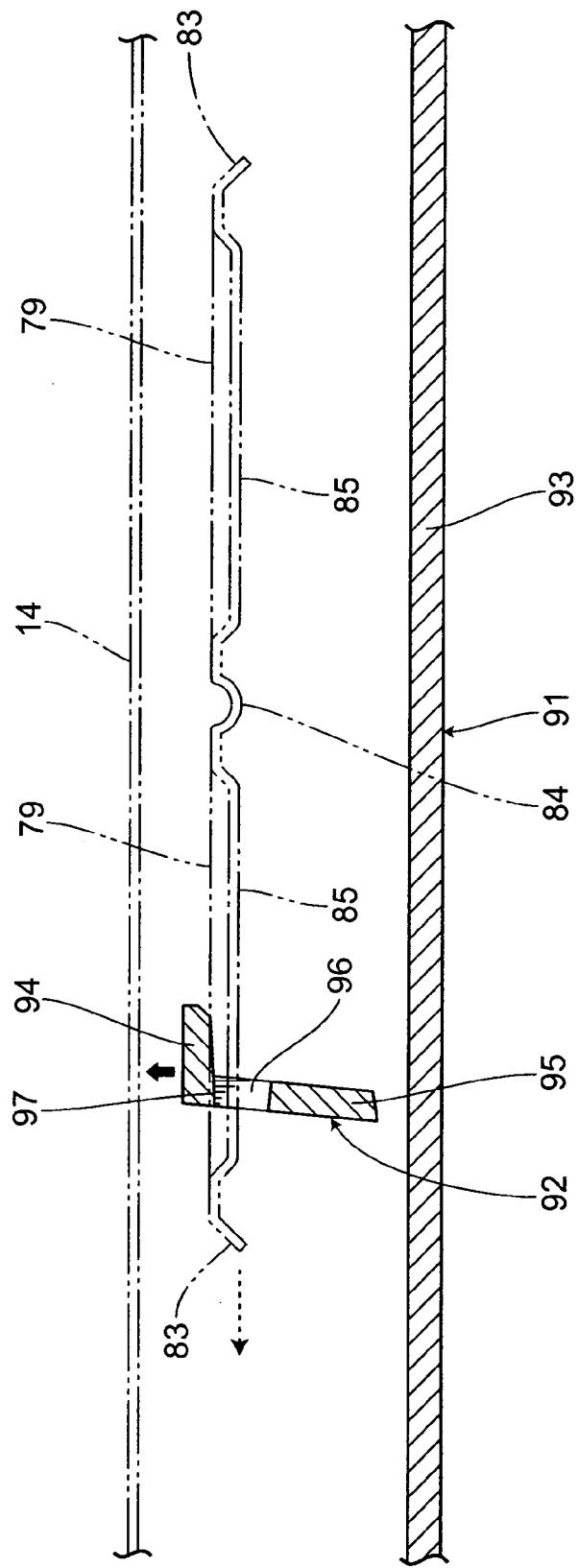
FIG. 19 is a cross sectional view showing an outer supporting piece and the attaching member in engaged condition.

Each of the attaching members 92 comprises: an attaching member body 94 joining the upper and bottom of the rear surface of the side-under spoiler body 93; and a rib member 95 integrally formed on either right or left of the attaching member body 94 (in FIG. 16, it is formed on the left of the attaching member body 94). The attaching member body 94 is formed in a plate shape, while it is parallel to the bracket 71 in the attached condition. An engagement opening 96 along the right-to-left direction is formed on the rib member 95, while the outer supporting piece 79 engages with this engagement opening 96. Corresponding to the engagement opening 96, an engagement concave portion 97 along the right-to-left direction is provided on a front surface of the attaching member body 94. The engagement concave portion 97 engages with a rear surface of the outer supporting piece 79. A protrusion 97a engaging with the bead 85 is formed on a portion in the center of the engagement concave portion 97. Meanwhile, the bracket piece 72 is made from, for example, a plate material having spring characteristic such as spring steel. Moreover, as shown in FIG. 19, the engagement concave portion 97 has a slope that comes close to the side-under spoiler body 93 along a direction-of the engagement of the outer supporting piece 79. Accordingly, when the outer supporting piece 79 is inserted and engaged with the engagement concave portion 97, the side-under spoiler 91 is pulled toward the vehicle body 14, and thus creation of a gap between the vehicle body 14 and the upper edge of the side-under spoiler body 93 can be prevented as shown in FIG. 17, while a packing sticks fast to the vehicle body 14.

Figure 17:
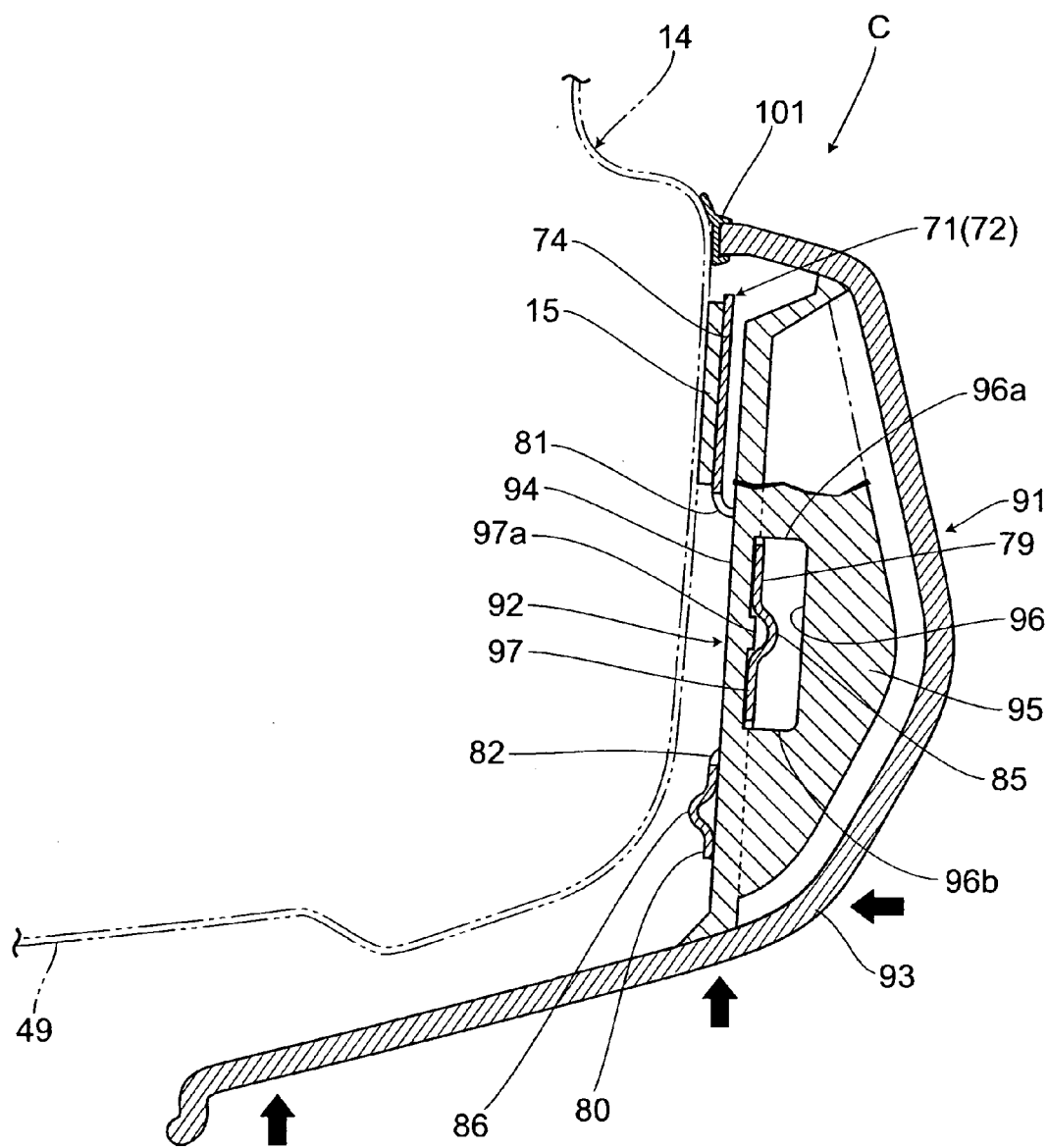
FIG. 17 is a cross sectional view showing the side-under spoiler attaching structure according to the third embodiment.
Figure 18:
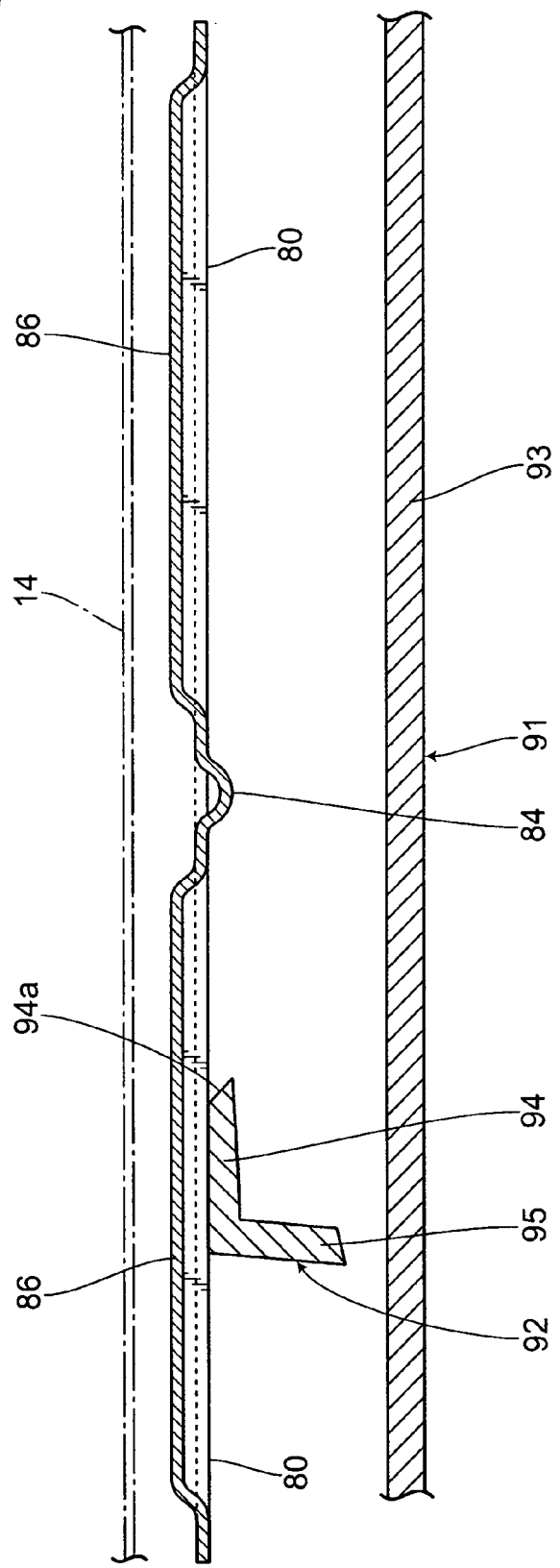
FIG. 18 is a cross sectional view showing an inner supporting piece and the attaching member in engaged condition.

As shown in the attaching condition of FIG. 17, in a condition where the rear surface of the outer supporting piece 79 contacts the engagement concave portion 97, a front surface of the inner supporting piece 80 contacts a rear surface of the attaching member body 94. More specifically, the attaching member body 94 is put between the outer supporting piece 79 and the inner supporting piece 80 from the width direction so as to engage therewith. Moreover, the outer supporting piece 79 is put between an upper edge 96a of the engagement opening 96 and a bottom edge 96b thereof from the vertical direction so as to confine the vertical position of the outer supporting piece 79. Further, a guiding edge 94a inclining from the rear to the front is formed on the other of right or left of the attaching member body 94 (in FIGS. 16 and 18, it is formed on the right of the attaching member body 94). Meanwhile, as shown in FIG. 17, it is preferable that the piece body 74 is bonded to an essentially perpendicular outer surface of the vehicle body 14 by the two-sided tape 15. In this fixed condition, the piece body 74 of the bracket piece 72 is subjected to be the upper end thereof, while the inner supporting piece 80 as the bottom end is subjected to be a free end.

Meanwhile, reference number 101 denotes the packing having elasticity, while this packing is provided between the vehicle body 14 and the upper edge of the side-under spoiler body 93.

The bracket 71 is formed by combining the plurality of bracket pieces 72. The bracket 71 is bonded to the attaching position of the vehicle body 14 via the two-sided tape 15. In the bracket 71, the superposition members 77, 77A are pre-joined by spot welding, bonding or the like so as to correspond to the attaching members 92 of the side-under spoiler 91. Alternatively, the bracket 71 may be formed by: marking a mark(s) (not shown) on the vehicle body 14 as a criterion (criteria) of the attaching position; bonding the plurality of bracket pieces 72 respectively to the vehicle body 14 from the right thereof in concert with the mark(s) by the two-sided tapes 15 provided on the rear surfaces of the plurality of bracket pieces 72; providing the other bracket piece 72 next to one of the bracket piece 72 so that a portion of the superposition member 77A of the other bracket piece 72 on the left is overlapped on the front surface of the superposition member 77 of one of the bracket piece 72 on the right; bonding the other bracket piece 72 on the vehicle body 14; and arranging the plurality of bracket pieces 72 in this manner. Meanwhile, the superposition members 77, 77A are joined by, for example, bonding. In this case, the plurality of bracket pieces 72 are positioned so that the respective supporting members 73 are aligned to the corresponding attaching member 92 of the side-under spoiler 91. After the bracket 71 is fixed, on either right or left side of the vehicle body. 14, the side-under spoiler 91 is moved to the front or rear direction of the vehicle body 14 so that the supporting members 75 engage with the attaching members 92. The attaching member body 94 is smoothly inserted in between the outer and inner supporting pieces 79, 80 by the guiding edge 94a. According to this engagement, the outer supporting piece 79 engages with the engagement opening 96, while the attaching member body 94 is put between the outer and inner supporting pieces 79, 80. Therefore, the side-under spoiler 91 is attached onto the vehicle body 14 by the bracket 71. Meanwhile, on the other side of the vehicle body 14, the supporting members 76 engage with the attaching members 92.

In the above-described structure, the two-sided tape 15 is provided on the upper portion of the bracket 71, and thus a peeling load to the two-sided tape 15 is applied downwardly when the side-under spoiler 91 is attached. Accordingly, the attaching strength when the side-under spoiler 91 is attached can be ensured. Moreover, for a downward load, the upper edge 96a engages with the outer supporting piece 79, and thus it can be certainly supported. Further, as illustrated by arrows in FIG. 17, when external forces pushing the bottom portion of the side-under spoiler 91 toward the vehicle body 14 are applied, a load resulting from the external forces does not concentrate in a single portion of the side-under spoiler attaching structure as the conventional ones since the inner supporting pieces 80 receive the external forces, while the bracket pieces 72 have spring characteristics.

Therefore, according to the third embodiment, the bracket 50 shown in FIGS. 5 and 10 does not necessary. When water or stepping stones splashed by tires hit the bottom of the side-under spoiler body 93, a shock resulting from this can be absorbed by the bracket 71, and thus generation of a sound when water or stepping stones hit can be prevented, while direct transmission of the shock to the vehicle body 14 can also be prevented. Moreover, compared to a conventional case employing a "clip-on" structure, the rear surface of the outer supporting piece 79 contact the front surface of the attaching member body 94, while the front surface of the inner supporting piece 80 contact the rear surface of the attaching member body 94. Accordingly, the attaching structure can be stable.

As described above, according to the third embodiment, each of the supporting members 73 of the bracket 71 comprises the plurality of outer and inner supporting pieces 79, 80 distant from with each other in the width direction. The attaching member body 94 is put between the outer and inner supporting pieces 79, 80 from the width direction, and thus each of the attaching members 92 of the side-under spoiler 91 is put between the outer and inner supporting pieces 79, 80 of the bracket 71 and supported. Therefore, a load applied to the side-under spoiler 91 along the width direction can be received, and thus attaching strength can be enhanced.

Further, since the bracket 71 comprises the combined bracket pieces 72 having at least one supporting piece 79 or 80, the bracket 71 can be formed by arranging the plurality of bracket pieces 72 according to a vehicle's shape. Therefore, degree of freedom in designing can be improved.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention within the claims are to be regarded to be in the scope of the present invention.

For example, the bracket 16, 71 of the first and second embodiment may be made from spring steel as that of the third embodiment. Moreover, the attaching members may be integrally formed on the side-under spoiler, or the attaching members may be fixed to the side-under spoiler by proper means.

What is claimed is:

1. A side-under spoiler attaching structure attaching a side-under spoiler to a bottom portion of a body of a vehicle via a bracket, wherein:
    said bracket is one elongated along a front-to-rear direction of the vehicle;
    a bonding means bonded to the body of the vehicle is provided on an upper portion of said bracket;
    supporting members for supporting said side-under spoiler are provided on a bottom portion of said bracket; and
    attaching members are provided on said side-under spoiler, said attaching members engaging with said supporting members by moving said side-under spoiler in the front-to-rear direction of the vehicles,
    wherein all of said supporting members for supporting said side-under spoiler are disposed below said bonding means.

2. The side-under spoiler attaching structure according to claim 1, wherein said supporting members of said bracket on right and left bottom portions of the body of the vehicle respectively engage with said attaching members of said side-under spoiler on the right and left bottom portions of the body of the vehicle so as to support said side-under spoiler when said side-under spoiler is moved in a same direction.

3. The side-under spoiler attaching structure according to claim 1, wherein:
    said supporting members are formed on said bracket along a front-to-rear direction of said bracket at predetermined intervals;
    said attaching members are formed on said side-under spoiler along a front-to-rear direction of said side-under spoiler at the predetermined intervals;
    said supporting members comprise supporting pieces, said supporting pieces being distant from one another in a vertical direction of said bracket so as to respectively engage with an upper portion of said attaching members or a bottom portion of said attaching members.

4. The side-under spoiler attaching structure according to claim 2, wherein:
    said supporting members are formed on said bracket along a front-to-rear direction of said bracket at predetermined intervals;
    said attaching members are formed on said side-under spoiler along a front-to-rear direction of said side-under spoiler at the predetermined intervals;
    said supporting members comprise supporting pieces, said supporting pieces being distant from one another in a vertical direction of said bracket so as to respectively engage with an upper portion of said attaching members or a bottom portion of said attaching members.

5. The side-under spoiler attaching structure according to claim 1, wherein:
    said supporting members comprise outer and inner supporting pieces, said outer and inner supporting pieces being distant from one another in a width direction defined from front to rear surfaces of said bracket; and said attaching members are put between said outer and inner supporting pieces in the width direction and engage with said outer and inner supporting pieces.

6. The side-under spoiler attaching structure according to claim 2, wherein:
said supporting members comprise outer and inner supporting pieces, said outer and inner supporting pieces being distant from one another in a width direction defined from front to rear surfaces of said bracket; and
said attaching members are put between said outer and inner supporting pieces in the width direction and engage with said outer and inner supporting pieces.

7. The side-under spoiler attaching structure according to claim 1, wherein said bracket comprises a plurality of bracket pieces combined with one another, each of said bracket pieces having at least one of said supporting members.

8. The side-under spoiler attaching structure according to claim 2, wherein said bracket comprises a plurality of bracket pieces combined with one another, each of said bracket pieces having at least one of said supporting members.

9. The side-under spoiler attaching structure according to claim 3, wherein said bracket comprises a plurality of bracket pieces combined with one another, each of said bracket pieces having said at least one of said supporting members.

10. The side-under spoiler attaching structure according to claim 4, wherein said bracket comprises a plurality of bracket pieces combined with one another, each of said bracket pieces having at least one of said supporting members.

11. The side-under spoiler attaching structure according to claim 5, wherein said bracket comprises a plurality of bracket pieces combined with one another, each of said bracket pieces having at least one of said supporting members.

12. The side-under spoiler attaching structure according to claim 6, wherein said bracket comprises a plurality of bracket pieces combined with one another, each of said bracket pieces having at least one of said supporting members.

13. The side-under spoiler attaching structure according to claim 7, wherein each of said bracket pieces comprises a piece body provided on an upper end thereof, said piece body being formed in an essentially rectangular-plate shape and having said bonding means, and
said supporting members of said bracket further comprise an outer supporting piece extending parallel to the piece body at an interval in the vertical direction and an inner supporting piece extending parallel to said outer supporting piece at an interval in the vertical direction.

14. The side-under spoiler attaching structure according to claim 1, wherein
said supporting members of the bracket have a bent portion, said bent portion engaging with said attaching members of the side-under spoiler by inserting said supporting members toward a lower portion or an upper portion of an inner surface of said attaching members of the side-under spoiler.

15. The side-under spoiler attaching structure according to claim 7, wherein, each of said bracket pieces comprise a piece body provided on an upper end thereof and fixed to the body of the vehicle with said bonding means; and said supporting members provided to have a free end on the bottom end of each of said bracket pieces.

16. A side-under spoiler attaching structure attaching a side-under spoiler to a bottom portion of a body of a vehicle via a bracket, wherein:
said bracket is one elongated along a front-to-rear direction of the vehicle;
a bonding means bonded to the body of the vehicle is provided on an upper portion of said bracket;
supporting members for supporting said side-under spoiler are provided on a bottom portion of said bracket; and
attaching members are provided on said side-under spoiler, said attaching members engaging with said supporting members by moving said side-under spoiler in the front-to-rear direction of the vehicle,
wherein said upper portion of said bracket is spaced from said attaching members and said spoiler, and
wherein all of said supporting members for supporting said side-under spoiler are disposed below said bonding means.

* * * * *